US012125465B2

(12) United States Patent
Makino et al.

(10) Patent No.: US 12,125,465 B2
(45) Date of Patent: Oct. 22, 2024

(54) NOISE CANCELLATION SIGNAL GENERATION DEVICE AND METHOD THEREOF

(71) Applicant: SONY GROUP CORPORATION, Tokyo (JP)

(72) Inventors: Kenichi Makino, Tokyo (JP); Kohei Asada, Tokyo (JP); Tetsunori Itabashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 327 days.

(21) Appl. No.: 17/429,450

(22) PCT Filed: Feb. 4, 2020

(86) PCT No.: PCT/JP2020/004015
§ 371 (c)(1),
(2) Date: Aug. 9, 2021

(87) PCT Pub. No.: WO2020/170789
PCT Pub. Date: Aug. 27, 2020

(65) Prior Publication Data

US 2022/0130364 A1 Apr. 28, 2022

(30) Foreign Application Priority Data

Feb. 18, 2019 (JP) ................................ 2019-026704

(51) Int. Cl.
*G10K 11/178* (2006.01)

(52) U.S. Cl.
CPC ................................. *G10K 11/178* (2013.01)

(58) Field of Classification Search
CPC .................................................... G10K 11/178
(Continued)

(56) References Cited

U.S. PATENT DOCUMENTS 5,267,320 A * 11/1993 Fukumizu ........ G10K 11/17857 381/71.12
2009/0086990 A1 4/2009 Christoph
2013/0039507 A1 2/2013 Park et al.

FOREIGN PATENT DOCUMENTS

CN 103827959 A 5/2014
EP 2043383 A1 4/2009
(Continued)

OTHER PUBLICATIONS

International Search Report and Written Opinion of PCT Application No. PCT/JP2020/004015, issued on Apr. 28, 2020, 09 pages of ISRWO.

*Primary Examiner* — Vivian C Chin
*Assistant Examiner* — Con P Tran
(74) *Attorney, Agent, or Firm* — CHIP LAW GROUP

(57) ABSTRACT

A noise cancellation signal generation device includes a reference sensor; a speaker that outputs sound based on a noise cancellation signal a memory that records second information for obtaining a filter coefficient of a noise cancellation filter calculated on the basis of first information obtained in consideration of a change in a relative position between the speaker and a noise cancellation point and a noise cancellation processor that acquires the second information from the memory using a signal acquired by a sensor, and generates the noise cancellation signal on the basis of the filter coefficient obtained from the acquired second information and a reference signal acquired by the reference sensor.

20 Claims, 25 Drawing Sheets

(58) Field of Classification Search
USPC .................. 381/71.1, 71.2–71.4, 71.6–71.8, 381/71.11–71.14, 373, 86, 122, 92; 455/570, 73; 700/94
See application file for complete search history.

(56) References Cited

FOREIGN PATENT DOCUMENTS

| | | | |
|---|---|---|---|
| EP | 2742504 | A2 | 6/2014 |
| JP | 2008-149922 | A | 7/2008 |
| JP | 2014-531141 | A | 11/2014 |
| KR | 10-2014-0053283 | A | 5/2014 |
| WO | 2013/022981 | A2 | 2/2013 |

* cited by examiner

NOISE CANCELLATION SIGNAL GENERATION DEVICE AND METHOD THEREOF

CROSS REFERENCE TO RELATED APPLICATIONS

This application is a U.S. National Phase of International Patent Application No. PCT/JP2020/004015 filed on Feb. 4, 2020, which claims priority benefit of Japanese Patent Application No. JP 2019-026704 filed in the Japan Patent Office on Feb. 18, 2019. Each of the above-referenced applications is hereby incorporated herein by reference in its entirety.

TECHNICAL FIELD

The present technology relates to a noise cancellation signal generation device, method, and program, and more particularly, to a noise cancellation signal generation device, method, and program capable of improving noise reduction performance.

BACKGROUND ART

Conventionally, various types of active noise cancelling (ANC) have been realized to reduce noise by generating a sound that cancels out noise from a speaker, and in particular, mounting an ANC function on a headphone has become very popular in recent years.

However, since the headphones block the ears when the headphones are worn, sounds to be listened to other than noise are also reduced, or a feeling of pressure or discomfort caused by wearing the headphones occurs in the over-ear headphones or the like. These are caused by wearing headphones.

With respect to such a headphone worn to cover the user's ear, there is an ear hole open type device in which a portion of the user's ear hole is not blocked when worn.

A feature of the ear hole open type device is that the user can listen to not only the sound reproduced by the ear hole open type device but also the surrounding sound.

In the ear hole open type device, since the vicinity of the user's ear hole is not blocked by the structure for reproducing the sound, the sound around the user can be acoustically regarded as being transmitted.

Therefore, similarly to the environment in which the normal earphone is not worn, the user hears the surrounding sound as it is, and the intended audio information and music are reproduced at the same time through the pipe-shaped or duct-shaped structure, so that the user can listen to both the sounds.

Since having such feature, according to the ear hole open type device, it is possible to improve reduction of sound other than noise caused by the above-described headphone wearing, pressure feeling, discomfort feeling, and the like.

However, in the ear hole open type device, it is difficult to reproduce sound of a low frequency, and it is difficult to realize ANC by the ear hole open type device alone.

Incidentally, in an automobile or the like, feedforward ANC is implemented in which not only an engine sound but also a road noise is acquired from a reference sensor, and a cancellation sound is generated from a speaker to cancel out the noise.

SUMMARY OF THE INVENTION

Problems to be Solved by the Invention

For example, if such road noise and engine sound are canceled out using an in-vehicle speaker, noise reduction performance better than ANC of the ear hole open type device alone can be obtained in a low frequency band.

However, since the control area is narrow in the ANC of the point control in which the noise control is performed at a certain point in the vehicle interior, the transmission characteristic to the ear changes when the user moves, and the noise reduction is not performed. That is, it is difficult to sufficiently reduce noise.

Therefore, a method of reducing noise in a certain closed space using wavefront control or boundary sound field control is also conceivable, but such a method requires a very large number of speakers, and thus is not realistic particularly for applications in a narrow space such as a passenger car.

The present technology has been made in view of such a situation, and an object thereof is to improve noise reduction performance in feedforward ANC.

Solutions to Problems

A noise cancellation signal generation device according to a first aspect of the present technology includes: a reference sensor; a speaker that outputs sound based on a noise cancellation signal; a memory that records second information for obtaining a filter coefficient of a noise cancellation filter calculated on the basis of first information obtained in consideration of a change in a relative position between the speaker and a noise cancellation point; and a noise cancellation processor that acquires the second information from the memory using a signal acquired by a sensor, and generates the noise cancellation signal on the basis of the filter coefficient obtained from the second information acquired and a reference signal acquired by the reference sensor.

A noise cancellation signal generation method or program according to a first aspect of the present technology is a noise cancellation signal generation method or program of a noise cancellation signal generation device, the device including: a reference sensor; a speaker that outputs sound based on a noise cancellation signal; and a memory that records second information for obtaining a filter coefficient of a noise cancellation filter calculated on the basis of first information obtained in consideration of a change in a relative position between the speaker and a noise cancellation point, in which the method or program includes steps of acquiring the second information from the memory by using a signal acquired by a sensor, and generating the noise cancellation signal on the basis of the filter coefficient obtained from the second information acquired and a reference signal acquired by the reference sensor.

A noise cancellation signal generation device according to a first aspect of the technology includes: a reference sensor; and a speaker that outputs sound based on a noise cancellation signal; a memory that records second information for obtaining a filter coefficient of a noise cancellation filter calculated on the basis of first information obtained in consideration of a change in a relative position between the speaker and a noise cancellation point, in which the second information is acquired from the memory using a signal acquired by a sensor, and the noise cancellation signal is generated on the basis of the filter coefficient obtained from the second information acquired and a reference signal acquired by the reference sensor.

A noise cancellation signal generation device according to a second aspect includes: a reference sensor; a speaker that outputs sound based on a noise cancellation signal; an acquisition unit that acquires, on the basis of a signal acquired by a sensor, second information for obtaining a filter coefficient of a noise cancellation filter calculated on the basis of first information obtained in consideration of a change in a relative position between the speaker and a noise cancellation point; and a noise cancellation processor that generates the noise cancellation signal on the basis of the filter coefficient obtained from the second information acquired and a reference signal acquired by the reference sensor.

A noise cancellation signal generation method or program according to a second aspect of the present technology is a noise cancellation signal generation method or program of a noise cancellation signal generation device, the device including: a reference sensor; and a speaker that outputs sound based on a noise cancellation signal, in which the noise cancellation signal generation method or program includes steps of acquiring, on the basis of a signal obtained by sensor, second information for obtaining a filter coefficient of a noise cancellation filter calculated on the basis of first information obtained in consideration of a change in a relative position between the speaker and a noise cancellation point, and generating the noise cancellation signal on the basis of the filter coefficient obtained from the second information acquired and a reference signal acquired by the reference sensor.

A noise cancellation signal generation device according to a second aspect of the present technology includes: a reference sensor; and a speaker that outputs sound based on a noise cancellation signal, in which second information is acquired, on the basis of a signal acquired by a sensor, for obtaining a filter coefficient of a noise cancellation filter calculated on the basis of first information obtained in consideration of a change in a relative position between the speaker and a noise cancellation point, and the noise cancellation signal is generated on the basis of the filter coefficient obtained from the second information acquired and a reference signal acquired by the reference sensor.

MODE FOR CARRYING OUT THE INVENTION

Hereinafter, embodiments, to which the present technology is applied, will be described with reference to the drawings.

First Embodiment

About ANC

The present technology makes it possible to obtain sufficient noise reduction performance at the ear position of the user by causing the control point to follow the motion of the user while performing feedforward ANC by outputting a noise cancellation signal from a speaker with both ear positions of the user as a control point without blocking the ear like a headphone.

Note that, in the following, a case where the present technology is applied to an automobile (vehicle) will be described as an example, but the present technology is not limited to automobiles and can be applied to all moving bodies such as railways, ships, and aircrafts.

First, the basic principle of the feedforward ANC will be described with reference to FIG. 1.

Figure 1:
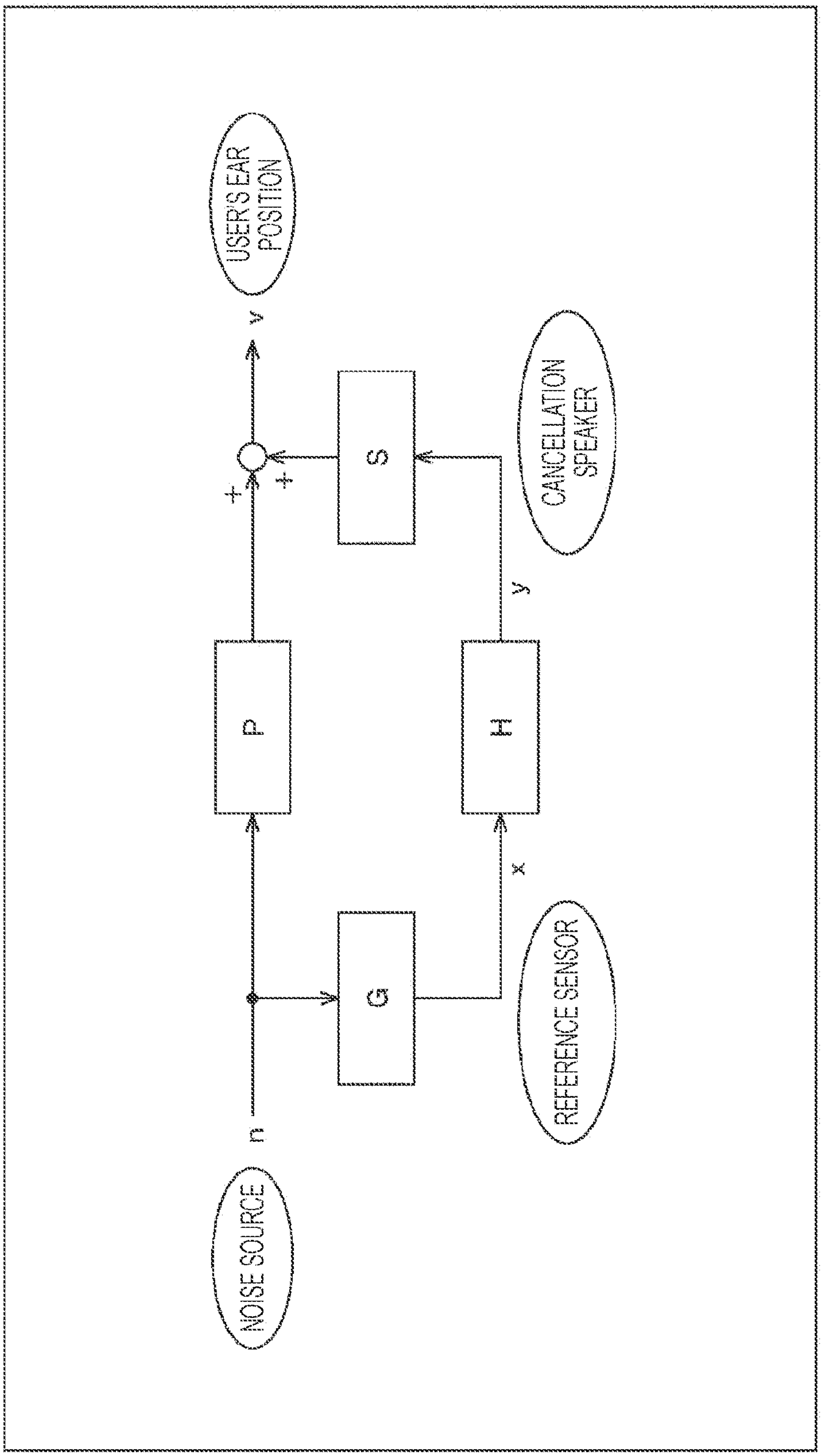
FIG. 1 is a diagram for explaining a feedforward ANC.

In FIG. 1, n represents a noise signal that is a noise sound emitted from a predetermined noise source, and v represents a noise signal that is a noise sound at the position of the user's ear. That is, the noise sound perceived by the user at the position of the user's ear is a noise signal v.

In particular, in this example, P in the drawing indicates a transmission characteristic from the noise source to the user's ear position, and the noise signal v can be expressed as shown in the following formula (1) using the transmission characteristic P and the noise signal n.

[Formula 1]

$$v=Pn \tag{1}$$

Meanwhile, the noise signal n is acquired by a reference sensor, and as a result, a reference signal x is obtained. Herein, the transmission characteristic from the noise source to the reference sensor is represented by G. The position of the reference sensor is also called a reference point.

In the ANC of the feedforward method, filter processing using an ANC filter H for noise canceling is performed on the reference signal x obtained by the reference sensor, and a noise cancellation signal y for canceling the noise signal v is generated.

That is, the noise cancellation signal y is an audio signal for causing a cancellation speaker to output a cancellation sound for reducing (canceling) the noise signal v at the user's ear position and can be obtained by the noise cancellation signal y=Hx.

The cancellation speaker that outputs the cancellation sound on the basis of the noise cancellation signal y is called a secondary sound source.

Moreover, S in FIG. 1 represents a transmission characteristic from the cancellation speaker to the user's ear position.

When this transmission characteristic S is used, the signal of the cancellation sound outputted from the cancellation speaker and reaching the user's ear position, that is, the noise cancellation signal is Sy=SHx.

Therefore, when the following formula (2) is satisfied from the noise cancellation signal SHx and the above formula (1), the noise signal v is completely canceled out by the noise cancellation signal SHx.

[Formula 2]

$$Pn+SHx=0 \tag{2}$$

Herein, since the reference signal x can be expressed as x=Gn using the noise signal n and the transmission characteristic G, if the transmission characteristic G from the noise source to the reference point is known, the following formula (3) is only required to be satisfied. That is, the ANC filter H, which is a noise cancellation filter, can be obtained by calculating the following formula (3).

[Formula 3]

$$H=S^{-1}PG^{-1} \tag{3}$$

Figure 2:
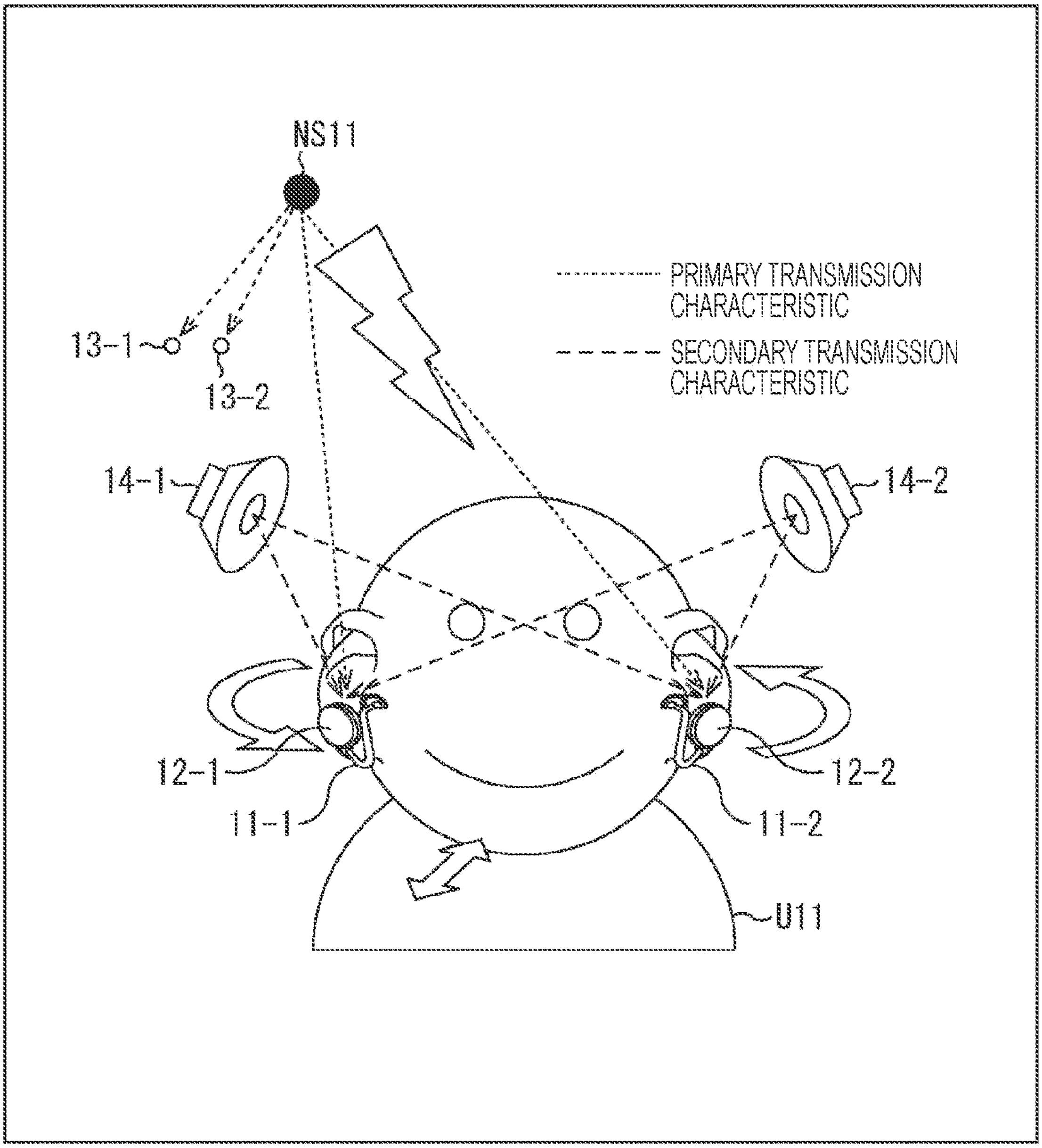
FIG. 2 is a diagram for explaining the feedforward ANC.

FIG. 2 illustrates a state in which the ANC with the ear position as the control point is realized using the microphone built in the ear hole open type device using such a basic principle.

In the example illustrated in FIG. 2, the ear hole open type device 11-1 is worn on the right ear of a user U11 in the vehicle interior, and the ear hole open type device 11-2 is worn on the left ear of the user U11.

Furthermore, the ear hole open type device 11-1 and the ear hole open type device 11-2 are provided with a control point microphone 12-1 and a control point microphone 12-2 as sensors for acquiring surrounding sound.

In particular, herein, the positions of the respective ear holes of the user U11, that is, the positions of the control point microphone 12-1 and the control point microphone 12-2 are set as control points that are noise cancellation points to be subjected to noise canceling.

Note that, hereinafter, in a case where it is not particularly necessary to distinguish the ear hole open type device 11-1 and the ear hole open type device 11-2, they are also simply referred to as the ear hole open type device 11.

Furthermore, hereinafter, in a case where it is not particularly necessary to distinguish the control point microphone 12-1 and the control point microphone 12-2, they are also simply referred to as a control point microphone 12.

Furthermore, a reference sensor 13-1 and a reference sensor 13-2 arranged at the reference points are provided in the vehicle interior where the user U11 is located. Hereinafter, in a case where it is not particularly necessary to distinguish the reference sensor 13-1 and the reference sensor 13-2, they will also be simply referred to as the reference sensor 13.

In addition, in-vehicle speakers 14-1 and 14-2 fixed in the vehicle interior are disposed in the vehicle interior in which the user U11 is located, and these speakers 14-1 and 14-2 are used as the cancellation speakers.

That is, at the control point, the noise sound emitted from the noise source NS11 is canceled by the cancellation sounds outputted from the speaker 14-1 and the speaker 14-2.

Hereinafter, in a case where it is not particularly necessary to distinguish the speaker 14-1 and the speaker 14-2, they will also be simply referred to as the speaker 14.

Figure 3:
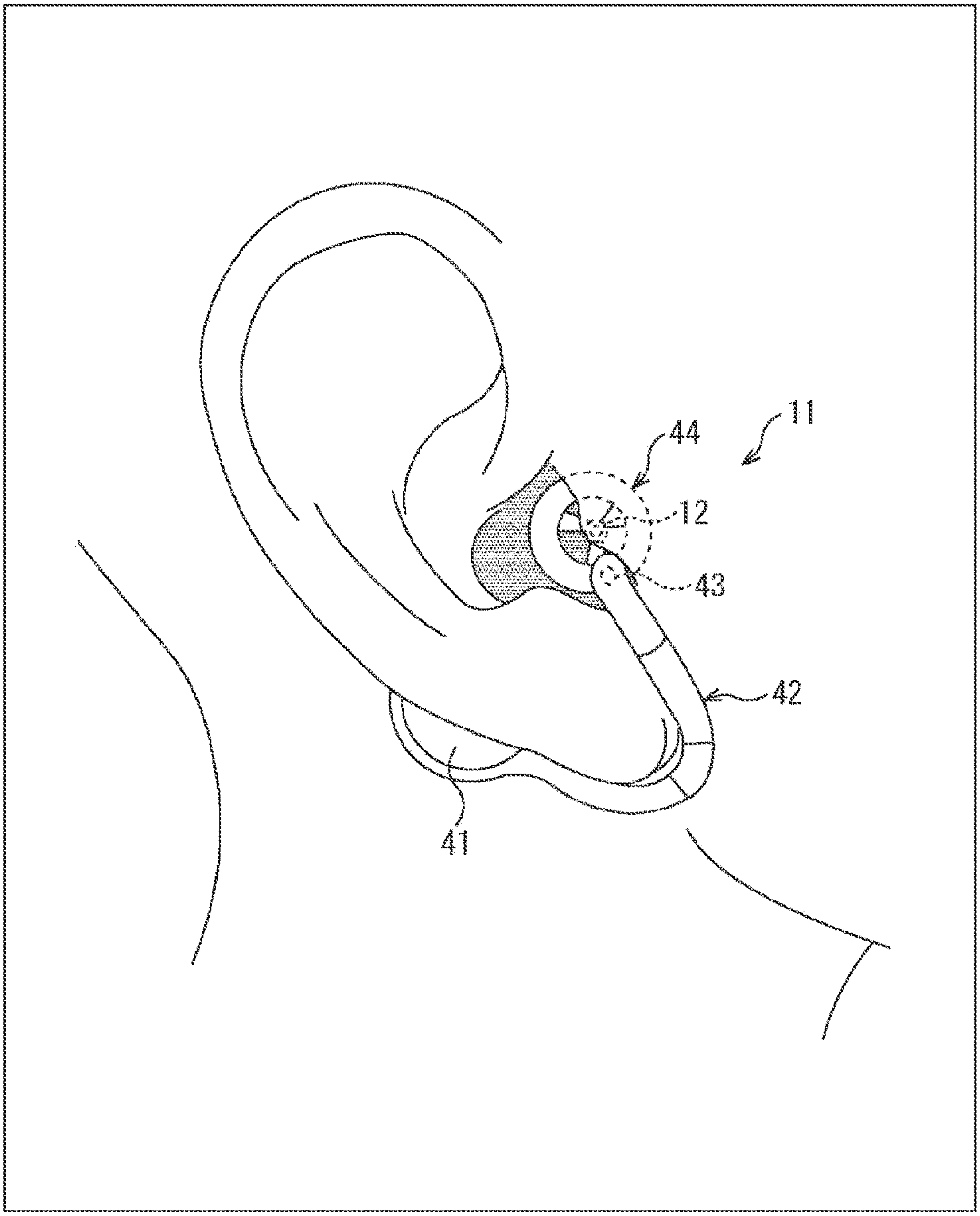
FIG. 3 is a diagram for explaining the configuration of an ear hole open type device.

The ear hole open type device 11 may be any device as long as the device can be worn on the ear of the user U11, and for example, as the ear hole open type device 11, one having the configuration illustrated in FIG. 3 can be used. Note that portions in FIG. 3 corresponding to those in FIG. 2 are denoted by the same reference signs, and the descriptions thereof will be omitted as appropriate.

In FIG. 3, the ear hole open type device 11 is in a state of being worn on the ear of the user U11.

In this example, the ear hole open type device 11 includes the speaker 41 that outputs sound, and the sound outputted by the speaker 41 passes through the tubular sound guiding portion 42 and is outputted from an output hole 43.

Furthermore, the ear hole open type device 11 is provided with a ring-shaped holding portion 44 that engages with the vicinity of the entrance of the ear canal, and the control point microphone 12 is fixed by a support member at a position inside the ring of the holding portion 44.

Moreover, for example, in a case where the noise sound emitted from the noise source NS11 illustrated in FIG. 2 is road noise, an acceleration sensor can be used as the reference sensor 13.

Figure 4:
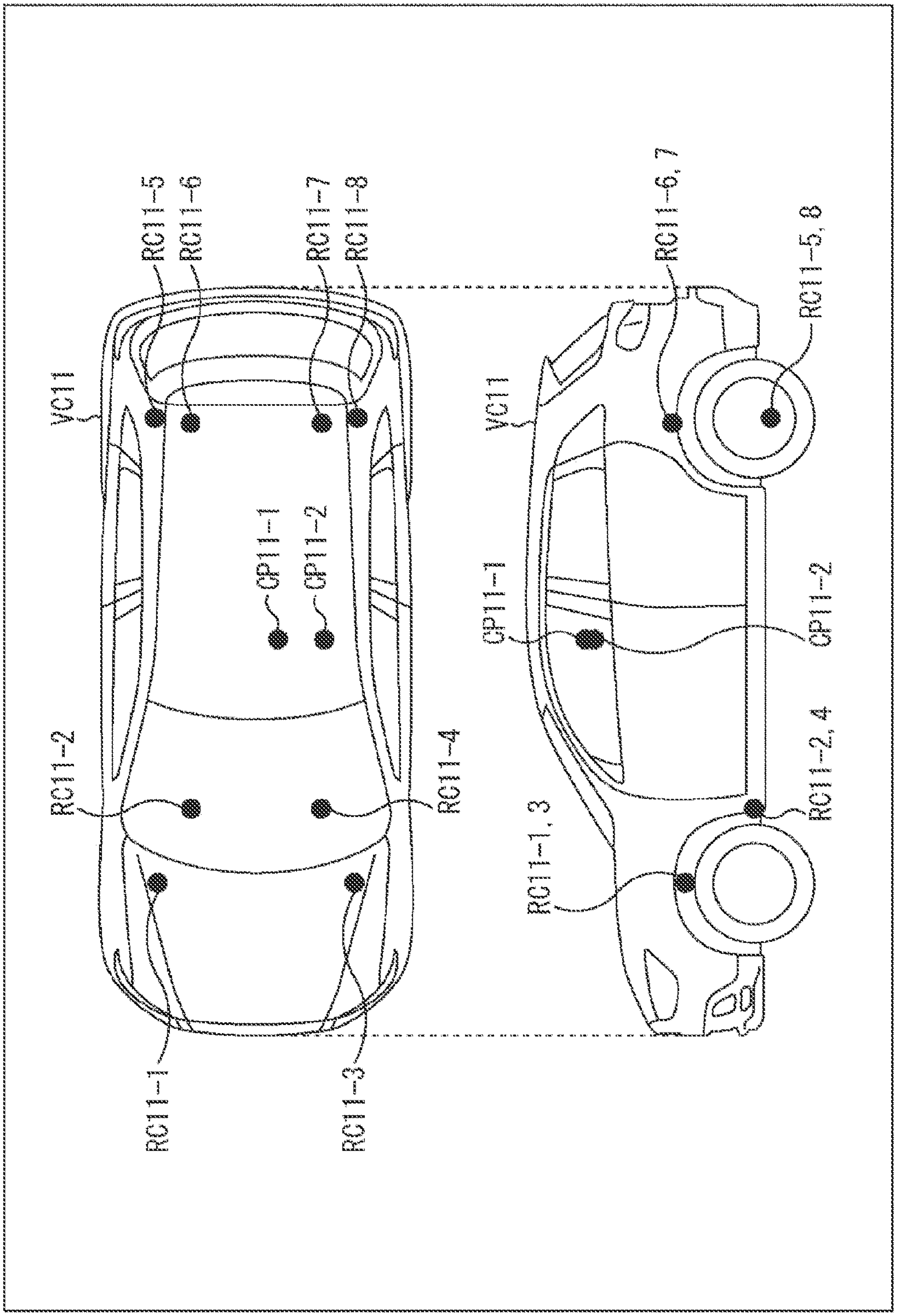
FIG. 4 is a diagram for explaining attachment positions of reference sensors.

In such a case, for example, it is conceivable to attach the reference sensor 13 to each position illustrated in FIG. 4.

In FIG. 4, a drawing of a vehicle VC11 as viewed from above is illustrated on the upper side, and a drawing of the vehicle VC11 as viewed from the side is illustrated on the lower side.

In this example, the positions of the passenger seat of the vehicle VC11 are the control point CP11-1 and the control point CP11-2. In particular, the positions of the control points CP11-1 and CP11-2 are the positions of the right ear and the left ear of the user sitting on the passenger seat, respectively.

The positions of the control points CP11-1 and CP11-2 correspond to the arrangement positions of the ear hole open type device 11-1 and the ear hole open type device 11-2 illustrated in FIG. 2.

Furthermore, in this example, a total of eight positions including four positions RC11-1 to RC11-4 in front of the vehicle VC11 and four positions RC11-5 to RC11-8 in rear of the vehicle VC11 are set as the arrangement positions of the reference sensors 13.

Specifically, the position RC11-1 and the position RC11-3 are the right front suspension position and the left front suspension position, and the position RC11-2 and the position RC11-4 are the right front vehicle body member position and the left front vehicle body member position.

Positions RC11-5 and RC11-8 are a right rear suspension vehicle body connection point position and a left rear suspension vehicle body connection point position, and positions RC11-6 and RC11-7 are a right rear suspension position and a left rear suspension position.

Note that, hereinafter, in a case where it is not particularly necessary to distinguish the positions RC11-1 to RC11-8, the positions will also be simply referred to as a position RC11.

In a case where an acceleration sensor as the reference sensor 13 is attached to each position RC 11, a signal indicating acceleration or the like measured (acquired) by the acceleration sensor is the reference signal x. In other words, the reference signal x is acquired by the reference sensor 13. In particular, in this example, the reference signal x is a signal corresponding to the road noise from a noise source NS11 observed at each position RC11.

Furthermore, although an example in which the reference sensor 13 is the acceleration sensor has been described herein, the reference sensor 13 may be a microphone or the like that collects surrounding sound including noise sound from the noise source NS11. When a microphone is used as the reference sensor 13, the reference signal x is an audio signal obtained by sound collection by the reference sensor 13.

Returning to the description of FIG. 2, suppose that the noise signal n emitted from the noise source NS11 is to be canceled, the transmission characteristic from the noise source NS11 to the ear position of the user U11, that is, the control point microphone 12 at the control point is the above-described transmission characteristic P. This transmission characteristic P is called a primary transmission characteristic.

Furthermore, the noise signal n from the noise source NS11 is acquired (measured) by the reference sensor 13, and filter processing using the ANC filter H is performed on the reference signal x obtained as a result.

Then, a cancellation sound based on the noise cancellation signal y obtained by the filter processing is outputted from the speaker 14 which is a cancellation speaker. Therefore, at each of the left and right ear positions of the user U11 as the control points, the noise signal v emitted from the noise source NS11 and reaching the ear position of the user U11 is canceled by the cancellation sound.

Note that the transmission characteristic S from the speaker 14 to the ear position of the user U11, to which the cancellation sound at this time is propagated, is referred to as a secondary transmission characteristic.

In the feedforward ANC, in a case where the ANC filter H is a fixed filter that is always the same, when the user U11 moves the position of the head, the primary transmission characteristic and the secondary transmission characteristic, that is, the transmission characteristic P and the transmission characteristic S change.

Therefore, when the user U11 moves the head, the noise reduction amount by the noise cancellation signal y, that is, the noise reduction performance for reducing the noise signal v changes.

On the other hand, since the ear hole open type device 11, in which the control point microphone 12 is built, is worn and fixed to the ear portion of the user U11, the relative positional relationship between the control point microphone 12 and the ear position does not change even if the user U11 moves the head.

Therefore, even when the user U11 moves the head, if the primary transmission characteristic and the secondary transmission characteristic can follow the change in the ear position of the user U11, the noise reduction amount by the noise cancellation signal y, that is, the noise reduction performance can be kept constant.

Figure 5:
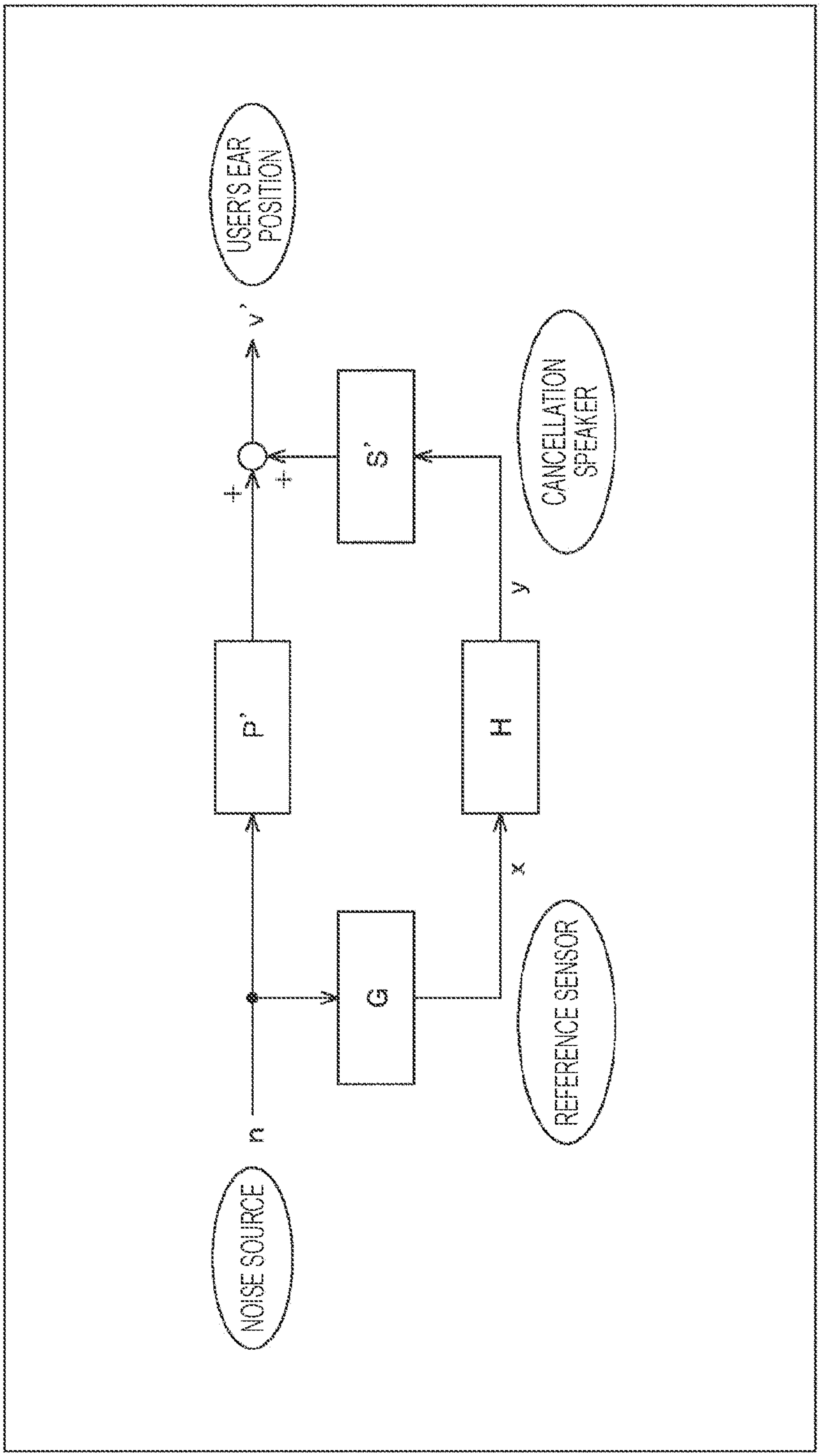
FIG. 5 is a diagram for explaining the feedforward ANC.

For example, when the user U11 moves the head from the state illustrated in FIG. 1, the primary transmission characteristic from the noise source NS11 to the ear position of the user U11 as a control point changes from the transmission characteristic P to the transmission characteristic P' as shown in FIG. 5. Therefore, the noise signal v at the ear position of the user U11 also changes to a noise signal v'.

Furthermore, when the user U11 moves the head, the secondary transmission characteristic from the speaker 14, which is the cancellation speaker, to the ear position of the user U11 as the control point also changes from the characteristic S to the transmission characteristic S'.

Therefore, in order to obtain the ANC effect following the movement of the head of the user U11, the ANC filter is only required to be changed from the ANC filter H shown in the above-described formula (3) to the ANC filter H' obtained from the transmission characteristic P' and the transmission characteristic S' as shown in the following formula (4).

[Formula 4]

$$H' = -S'^{-1}P \quad G^{-1} \tag{4}$$

Figure 6:
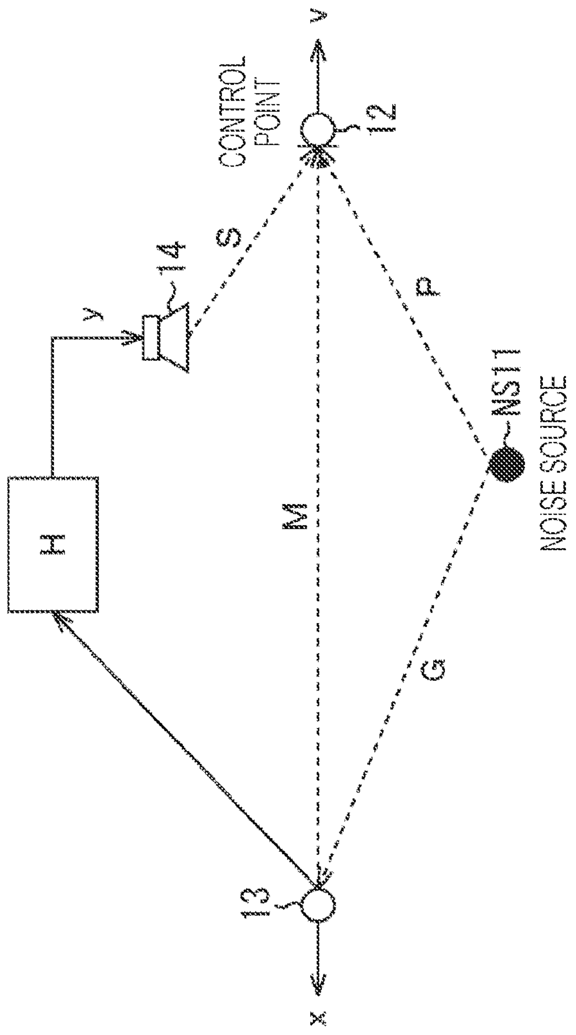
FIG. 6 is a diagram for explaining a transmission characteristic from a reference point to a control point.

Herein, for example, as illustrated in FIG. 6, it is considered to introduce a virtual transmission characteristic M from a reference point that is the position of the reference sensor 13 to a control point that is the ear position of the user U 11. Note that portions in FIG. 6 corresponding to those in FIG. 2 are denoted by the same reference signs, and the descriptions thereof will be omitted as appropriate.

In the example illustrated in FIG. 6, the arrangement position of the control point microphone 12 is the control point, and a transmission characteristic between the reference point and the control point is a transmission characteristic M.

In this case, the noise signal from the noise source NS11 is collected (observed) by the control point microphone 12 at the control point, whereby the noise signal v reaching the control point from the noise source NS11 can be obtained. Hereinafter, an audio signal (observation signal) obtained by sound collection by the control point microphone 12 is referred to as a microphone signal v.

The microphone signal v and the reference signal x have a relationship of v=Mx. Furthermore, $M=PG^{-1}$ can be obtained from the relationship of the noise signal v=Mx and the relationship of the above formula (1) and the reference signal x=Gn.

As can be seen from the above formula (3), if the transmission characteristic S, the transmission characteristic P, and the transmission characteristic G can be obtained, the ANC filter H can be obtained.

Herein, the transmission characteristic S, which is the secondary transmission characteristic, can be measured by outputting a predetermined measurement sound from the speaker 14, which is a cancellation speaker, and observing (collecting) the measurement sound with the control point microphone 12 arranged at the control point.

On the other hand, as for the transmission characteristic P and the transmission characteristic G, since the position of the noise source NS11 is not fixed, it is difficult to directly measure the transmission characteristic P and the transmission characteristic G.

However, the transmission characteristic M corresponding to the $PG^{-1}$ in the formula (3) can be identified by a method such as an actual operation transfer path analysis (TPA) after the reference signal x and the microphone signal v are measured by the reference sensor 13 and the control point microphone 12.

When the transmission characteristic M is identified, the ANC filter H can be obtained by calculating the following Formula (5) obtained from the relationship of $M=PG^{-1}$ and the above-described Formula (3).

[Formula 5]

$$H=-S^{-1}M \quad (5)$$

Furthermore, as described above, when the head of the user U 11 moves, the transmission characteristic S changes to become the transmission characteristic S', and this transmission characteristic S' can also be measured even during the operation of the ANC, similarly to the transmission characteristic S. That is, the transmission characteristic S' can be measured by outputting predetermined measurement sound from the speaker 14, which is a cancellation speaker, and observing (collecting) the measurement sound with the control point microphone 12 arranged at the ear position of the user U11 which is a control point.

On the other hand, it is difficult to directly measure the transmission characteristic M.

That is, the transmission characteristic M can be obtained only by an indirect method such as acquiring and identifying signals at a reference point and a control point (user's ear position) under an environment where only target noise (noise sound) exists. Therefore, it is difficult to measure the transmission characteristic M in the use state of the ANC in which various sounds exist.

About Present Technology

Therefore, in the present technology, it is possible to realize the feedforward ANC following the movement of the head of the user U11 by performing the following three steps STP1 to STP3.

Hereinafter, processings of steps STP1 to STP3 will be described.

(Step STP1)

Before the ANC is operated, the transmission characteristic M between the reference point and the control point in the movable range of the user's head and the transmission characteristic S, which is the secondary transmission characteristic, are obtained by preliminary measurement, and the transmission characteristic M and the transmission characteristic S are stored in the database in association with each other.

(Step STP2)

The transmission characteristic S', which is the secondary transmission characteristic is obtained by measurement during the operation of the ANC.

(Step STP3)

The transmission characteristic S closest to the transmission characteristic S' obtained in step STP2 is searched from the database generated in step STP1, and the ANC filter H is updated using the transmission characteristic M associated with the transmission characteristic S obtained by the search.

Herein, the processings of steps STP1 to STP3 described above will be described more specifically with reference to FIGS. 7 to 10.

Note that portions in FIGS. 7 to 10 corresponding to those in FIG. 2 are denoted by the same reference signs, and the descriptions thereof will be omitted as appropriate. Furthermore, portions in FIGS. 7 to 10 corresponding to each other are denoted by the same reference signs, and the descriptions thereof will be omitted as appropriate.

First, in step STP1, to measure the transmission characteristic S which is the secondary transmission characteristic, it is necessary to identify the transmission characteristic M between the reference point and the control point simultaneously with the measurement, and associate the transmission characteristic S and the transmission characteristic M.

Therefore, when the noise to be the target (subject) in the ANC is road noise generated outside the vehicle, it is necessary to measure the transmission characteristic S, which is the secondary transmission characteristic, under an environment where the road noise exists in order to identify the transmission characteristic M.

Figure 7:
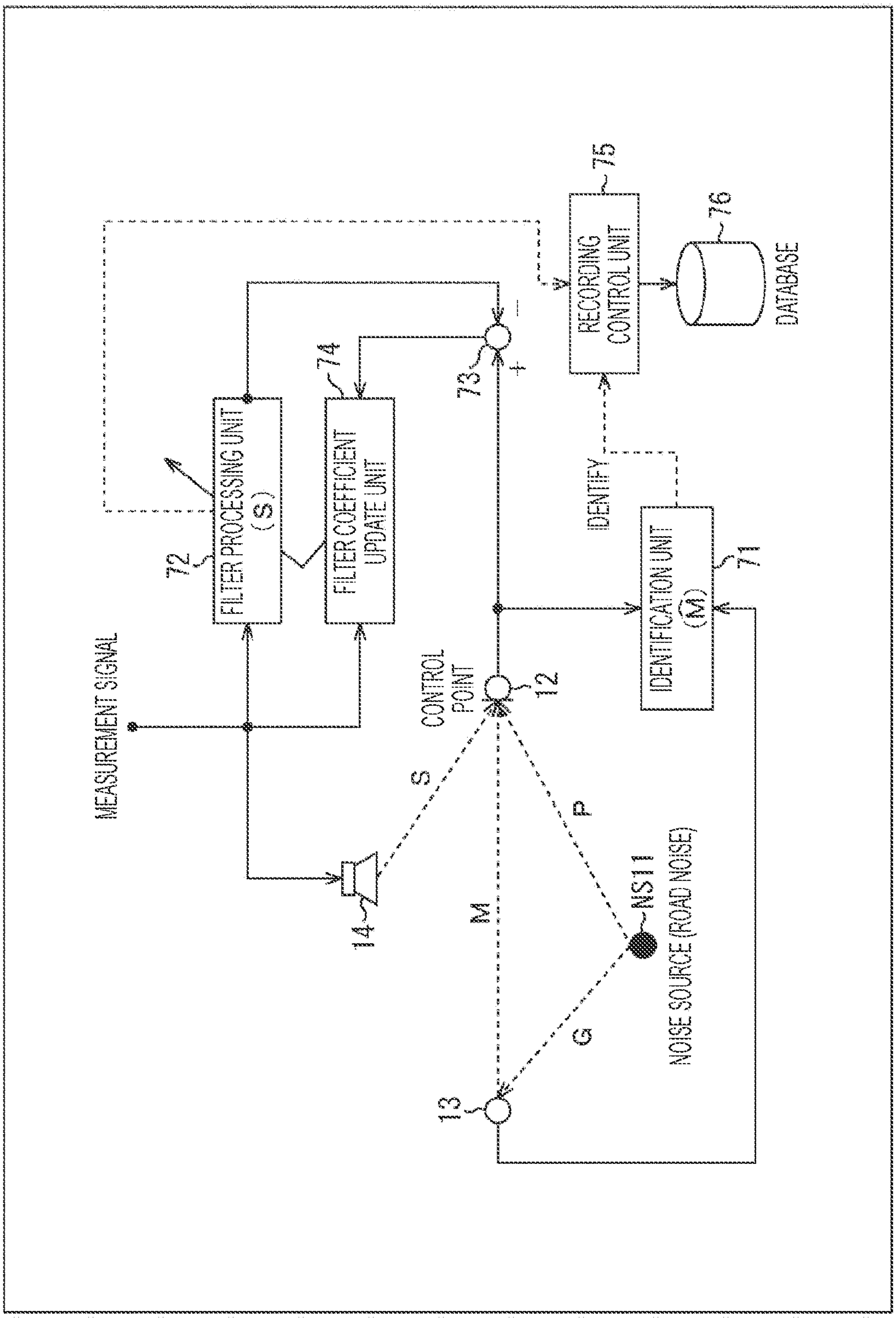
FIG. 7 is a diagram for explaining preliminary measurement of a transmission characteristic.

Therefore, for example, as illustrated in FIG. 7, the transmission characteristic S may be identified by an adaptive algorithm using a measurement signal such as white noise uncorrelated with road noise.

In the example illustrated in FIG. 7, road noise is emitted from the noise source NS 11 as the noise signal n. Furthermore, the speaker 14, which is a cancellation speaker, outputs measurement sound based on a measurement signal such as white noise uncorrelated with road noise.

Then, the reference signal x obtained by the reference sensor 13 observing the road noise and the microphone signal v obtained by the control point microphone 12 collecting the road noise and the like are supplied to the identification unit 71. Note that the microphone signal v obtained at timing when the measurement sound is not outputted as much as possible is used to identify the transmission characteristic M.

In the identification unit 71, the transmission characteristic M is identified by the actual operation TPA or the like on the basis of the reference signal x supplied from the reference sensor 13 and the microphone signal v supplied from the control point microphone 12.

Moreover, the transmission characteristic S is measured (identified) by the filter processing unit 72 to the filter coefficient update unit 74.

Specifically, the filter processing unit 72 performs filter processing on the supplied measurement signal such as white noise on the basis of the transmission characteristic S supplied from the filter coefficient update unit 74, more specifically, the filter coefficient constituting the filter for adding the transmission characteristic S. The filter processing unit 72 supplies the filter signal obtained by the filter processing to an arithmetic unit 73.

The arithmetic unit 73 generates a differential signal by subtracting the filter signal supplied from the filter processing unit 72 from the microphone signal v supplied from the control point microphone 12, and supplies the differential signal to the filter coefficient update unit 74. Note that, in the measurement of the transmission characteristic S, the microphone signal v at the timing including only the measurement sound and not including the road noise is used as much as possible.

Herein, the measurement by the reference sensor 13 and the sound collection by the control point microphone 12 are performed substantially simultaneously, but the output and the sound collection timing of the measurement sound are appropriately adjusted so that the microphone signal v suitable for each of the identification of the transmission characteristic M and the measurement of the transmission characteristic S can be obtained.

The filter coefficient update unit 74 that implements the adaptive algorithm updates a filter coefficient constituting a filter for adding the transmission characteristic S, more specifically, the transmission characteristic S, on the basis of the supplied measurement signal and the differential signal supplied from the arithmetic unit 73, and supplies the updated filter coefficient to the filter processing unit 72. At this time, the filter coefficient update unit 74 updates the filter coefficient so that the differential signal becomes a silent signal (zero signal).

When such a process of updating the filter coefficient is performed a plurality of times and the process converges, the transmission characteristic S is finally obtained by measurement (estimation). The filter processing unit 72 outputs the finally obtained filter coefficient as the transmission characteristic S.

When the transmission characteristic M and the transmission characteristic S are obtained by the above processing, the transmission characteristic M and the transmission characteristic S are associated with each other and recorded (stored) in a memory 76 as a database by the recording control unit 75. For example, the memory 76 is a nonvolatile recording medium such as a hard disk.

The transmission characteristic M and the transmission characteristic S associated in this manner are a set of the transmission characteristic M and the transmission characteristic S in a case where the head of the user wearing the ear hole open type device 11 is at a predetermined position.

Therefore, if the transmission characteristic M and the transmission characteristic S are obtained for each position within the movable range of the head of the user, and the transmission characteristic M and the transmission characteristic S are recorded in the memory 76 in association with each other, the ANC filter H at any head position of the user can be obtained.

In the present technology, in consideration of a change in a relative positional relationship between the speaker 14 and a control point that is a noise cancellation point, that is, the ear position of the user, the transmission characteristic M and the transmission characteristic S are obtained for each of a plurality of mutually different relative positional relationships and stored in the memory 76.

A measurement device is realized by the control point microphone 12, the reference sensor 13, the speaker 14, the identification unit 71, the filter processing unit 72, the arithmetic unit 73, the filter coefficient update unit 74, the recording control unit 75, and the memory 76 which are blocks for generating a database.

Figure 8:
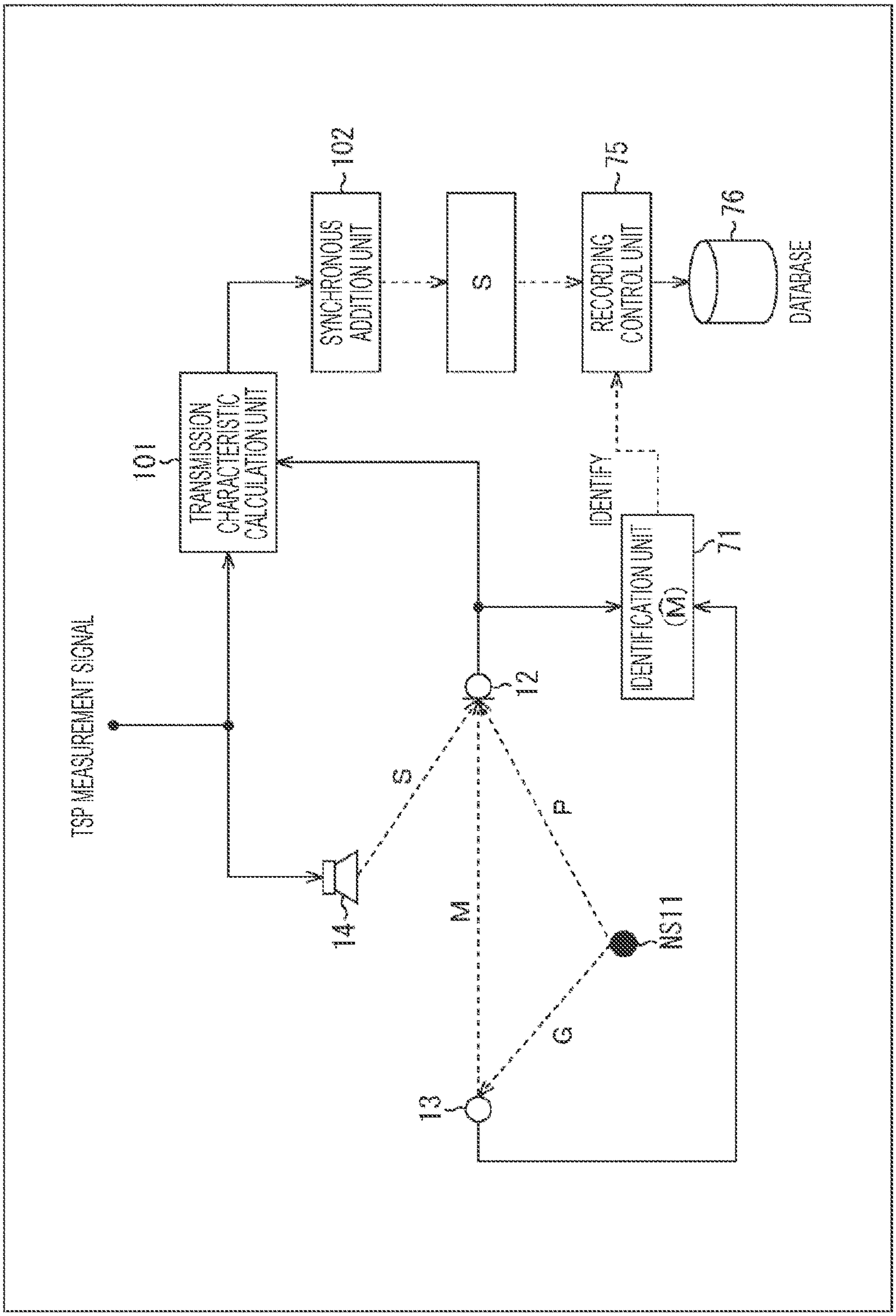
FIG. 8 is a diagram for explaining preliminary measurement of a transmission characteristic.

In addition, for example, as illustrated in FIG. 8, the transmission characteristic S may be measured using time stretched pulse (TSP), and a sufficient number of synchronous additions may be performed on the measurement result to eliminate the influence of road noise.

In the example illustrated in FIG. 8, the speaker 14 outputs measurement sound based on the TSP measurement signal. Then, a transmission characteristic calculation unit 101 obtains the transmission characteristic S on the basis of the TSP measurement signal and the microphone signal v supplied from the control point microphone 12, and supplies the transmission characteristic S to a synchronous addition unit 102.

A synchronous addition unit 102 sequentially synchronously adds the plurality of transmission characteristics S supplied from the transmission characteristic calculation unit 101, and supplies a transmission characteristic obtained as a result to the recording control unit 75 as a final transmission characteristic S.

The recording control unit 75 records the transmission characteristic M supplied from the identification unit 71 and the transmission characteristic S supplied from the synchronous addition unit 102 in the memory 76 in association with each other.

When the transmission characteristic M and the transmission characteristic S are obtained in advance as described above, the ANC can be actually performed thereafter, and step STP2 is performed during the operation of the ANC.

That is, in step STP2, the transmission characteristic S' as the secondary transmission characteristic is measured according to the movement of the head of the user.

In the measurement of the transmission characteristic S', considering that the ANC is in operation, it is desirable to use a signal that does not disturb the user as much as possible.

Figure 9:
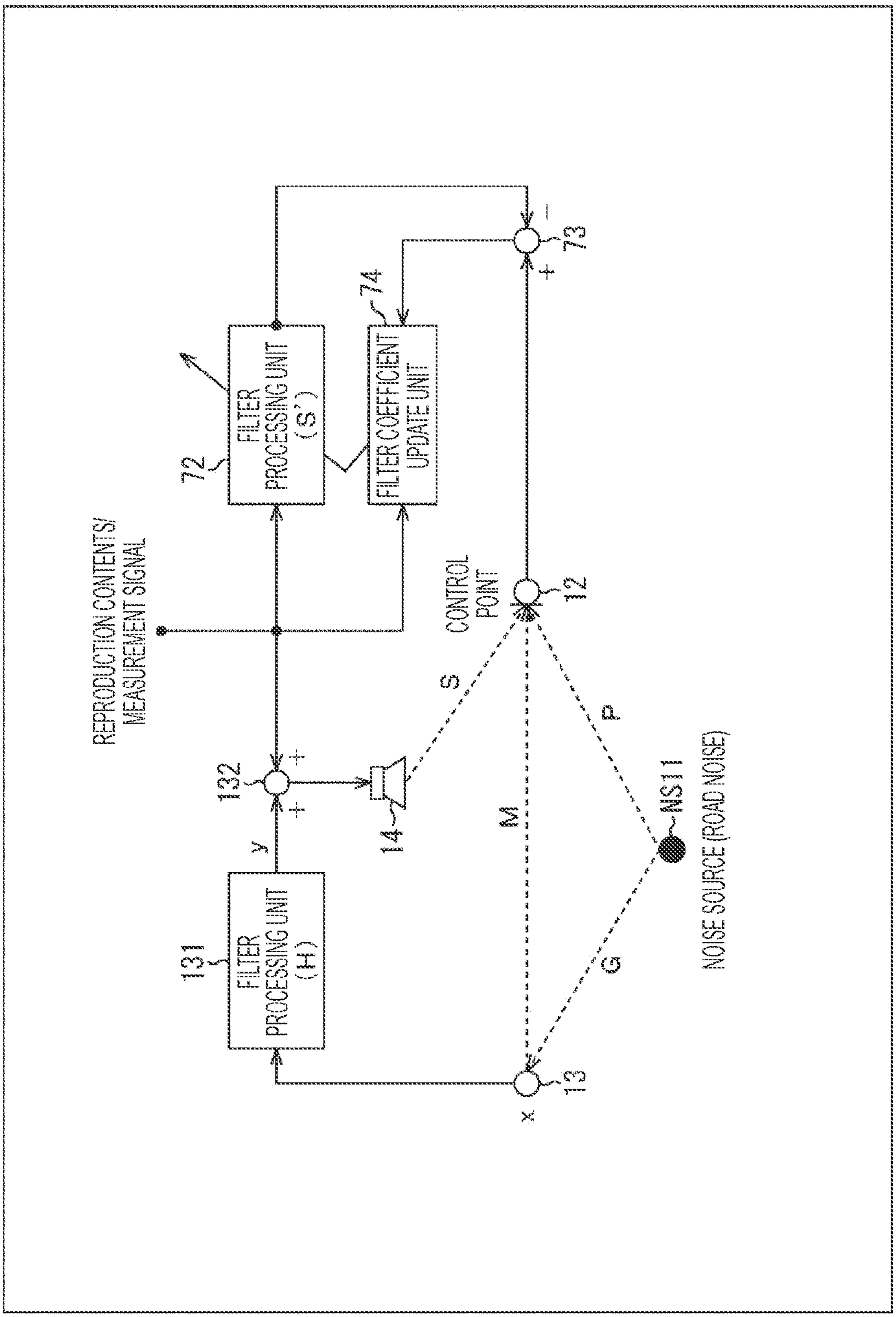
FIG. 9 is a diagram for explaining measurement of transmission characteristics during ANC operation.

Therefore, for example, during the ANC operation, in a case where the in-vehicle speaker is used as a cancellation speaker, that is, the speaker 14 is an in-vehicle speaker, and contents such as music is reproduced by the speaker 14, the transmission characteristic S' may be identified as illustrated in FIG. 9.

In the example in FIG. 9, it is assumed that there is no correlation between the road noise emitted from the noise source NS11 and the content signal of the contents such as music reproduced by the speaker 14 which is an in-vehicle speaker and is also used as a cancellation speaker.

In this case, in FIG. 7, the measurement signal is used for measuring the secondary transmission characteristic (transmission characteristic S), but as illustrated in FIG. 9, in the measurement of the transmission characteristic S' during the ANC operation, a content signal can be used instead of the measurement signal. That is, the transmission characteristic S' that is the secondary transmission characteristic can be identified by the adaptive algorithm using the content signal.

Note that a measurement signal may be used to identify the transmission characteristic S', but herein, it is assumed that the transmission characteristic S' is identified using a content signal.

Specifically, in the example illustrated in FIG. 9, the reference signal x obtained by the reference sensor 13 is supplied to the filter processing unit 131.

The filter processing unit 131 performs filter processing on the reference signal x supplied from the reference sensor 13 on the basis of the held filter coefficients constituting the ANC filter H, and supplies the noise cancellation signal y obtained as a result to the arithmetic unit 132.

The arithmetic unit 132 adds the noise cancellation signal y supplied from the filter processing unit 131 and the supplied content signal, and supplies the result to the speaker 14. The speaker 14 outputs sound on the basis of the signal supplied from the arithmetic unit 132.

Therefore, at the control point, the contents based on the content signal are reproduced, and the road noise is canceled by the cancellation sound based on the noise cancellation signal y.

Furthermore, in the filter processing unit 72 to the arithmetic unit 73, processing similar to that in the case of FIG. 7 is performed to measure (identify) the transmission characteristic S'. However, herein, the transmission characteristic S' is identified using the content signal instead of the measurement signal.

Note that, although an example in which the content signal itself is used for identification of the transmission characteristic S', that is, the content signal itself is used as the measurement signal has been described herein, the measurement signal may be generated on the basis of the content signal.

In such a case, an auditory masking threshold is calculated for each particular frequency band on the basis of the content signal. Then, a signal in which a component (band signal) of each frequency band is smaller than the masking threshold is set as the measurement signal so that the measurement sound does not disturb the user, that is, the measurement sound is not heard by the user.

When the processing of step STP2 is performed and the transmission characteristic S' is obtained, the processing of step STP3 is subsequently performed.

Figure 10:
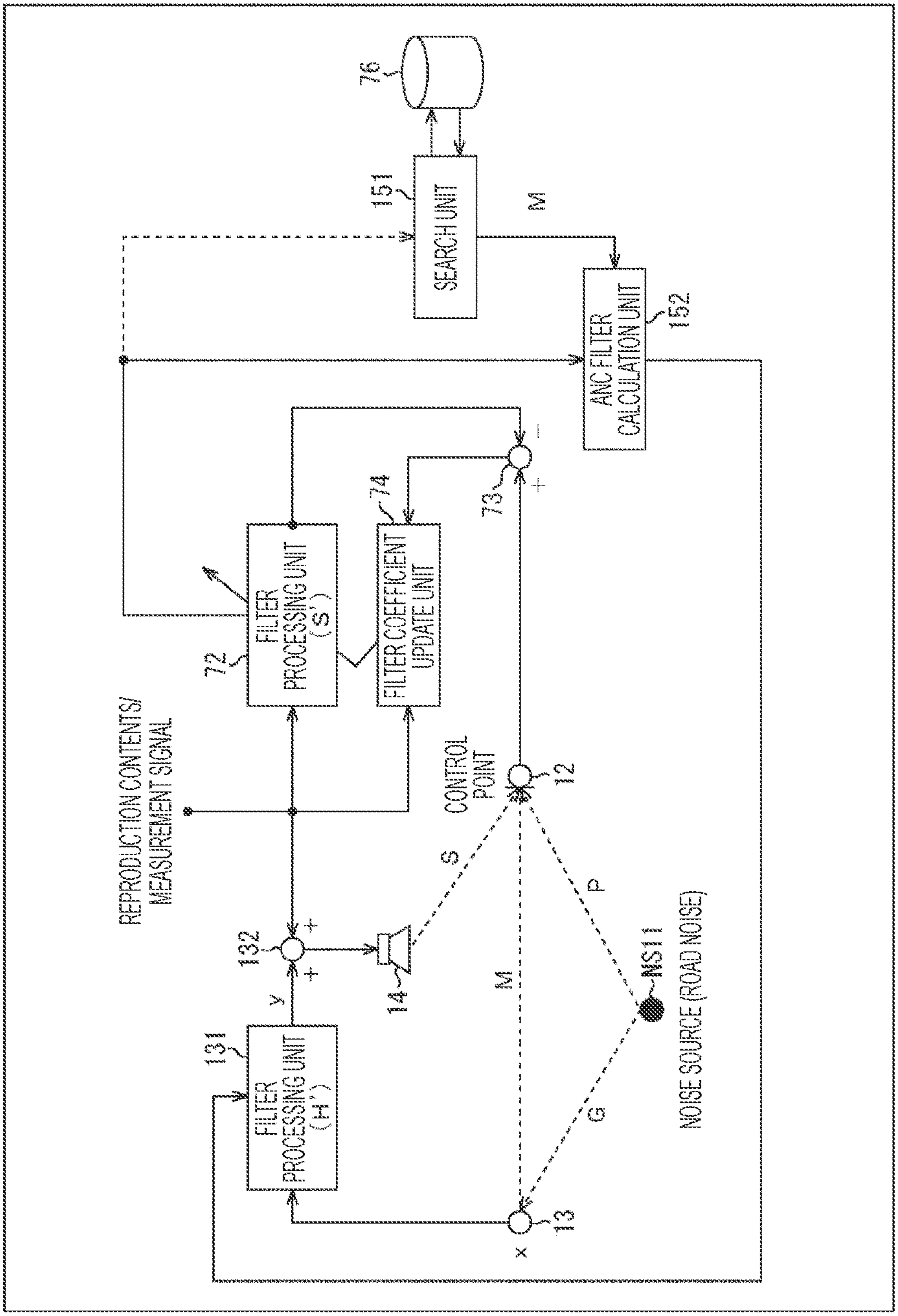
FIG. 10 is a diagram for explaining updating of an ANC filter during an ANC operation.

Specifically, for example, as illustrated in FIG. 10, the ANC filter H is updated on the basis of the transmission characteristic S' to be the ANC filter H'.

In the example illustrated in FIG. 10, the transmission characteristic S' obtained in the processing of step STP2 is supplied from the filter processing unit 72 to the search unit 151 and the ANC filter calculation unit 152.

The search unit 151 searches for the transmission characteristic M associated with the transmission characteristic S closest to the transmission characteristic S' supplied from the filter processing unit 72 from among the transmission characteristics M and the transmission characteristics S recorded in association with the memory 76.

Then, the search unit 151 acquires (reads out) the transmission characteristic M obtained by the searching from the memory 76 and supplies the transmission characteristic M to the ANC filter calculation unit 152.

Therefore, the ANC filter calculation unit 152 is supplied with the transmission characteristic S' and the transmission characteristic M for the current position of the head (ear) of the user, that is, the position of the control point.

Since the search unit 151 searches for the transmission characteristic M using the transmission characteristic S' calculated from the microphone signal v obtained by the control point microphone 12 as a key, it can be said that the transmission characteristic M is acquired using the microphone signal v.

The ANC filter calculation unit 152 calculates the ANC filter H' by calculating the above-described Formula (5) on the basis of the transmission characteristic S' supplied from the filter processing unit 72 and the transmission characteristic M supplied from the search unit 151.

The ANC filter calculation unit 152 supplies the calculated ANC filter H' to the filter processing unit 131 to update the ANC filter H.

When the ANC filter H' is supplied from the ANC filter calculation unit 152, the filter processing unit 131 preferably performs interpolation processing or the like on the basis of the ANC filter H before the update and the newly supplied ANC filter H', and smoothly transitions the ANC filter H before and after the update. As a result, the ANC filter H is appropriately updated.

Then, in the filter processing unit 131, the ANC operation is performed using the updated ANC filter H'. That is, the filter processing unit 131 performs filter processing on the reference signal x supplied from the reference sensor 13 on the basis of the filter coefficient of the ANC filter H', and supplies the noise cancellation signal y obtained as a result to the arithmetic unit 132.

The arithmetic unit 132 adds the noise cancellation signal y supplied from the filter processing unit 131 and the supplied content signal, and supplies the result to the speaker 14. The speaker 14 outputs sound on the basis of the signal supplied from the arithmetic unit 132.

As described above, even when the user moves the head during the ANC operation, an appropriate ANC filter H' can be obtained. Therefore, according to the present technology, even in the feedforward ANC, it is possible to sufficiently reduce the target noise sound at the control point. In other words, the noise reduction performance can be improved.

Note that the same or different ones may be used as the control point microphone 12, the reference sensor 13, the speaker 14, the filter processing unit 72, the arithmetic unit 73, and the filter coefficient update unit 74 at the time of measuring the transmission characteristic S in advance described with reference to FIG. 7 and at the time of measuring the transmission characteristic S' during the ANC operation described with reference to FIG. 9.

Configuration Example of ANC System

Next, the ANC system to which the present technology described above is applied will be described.

Figure 11:
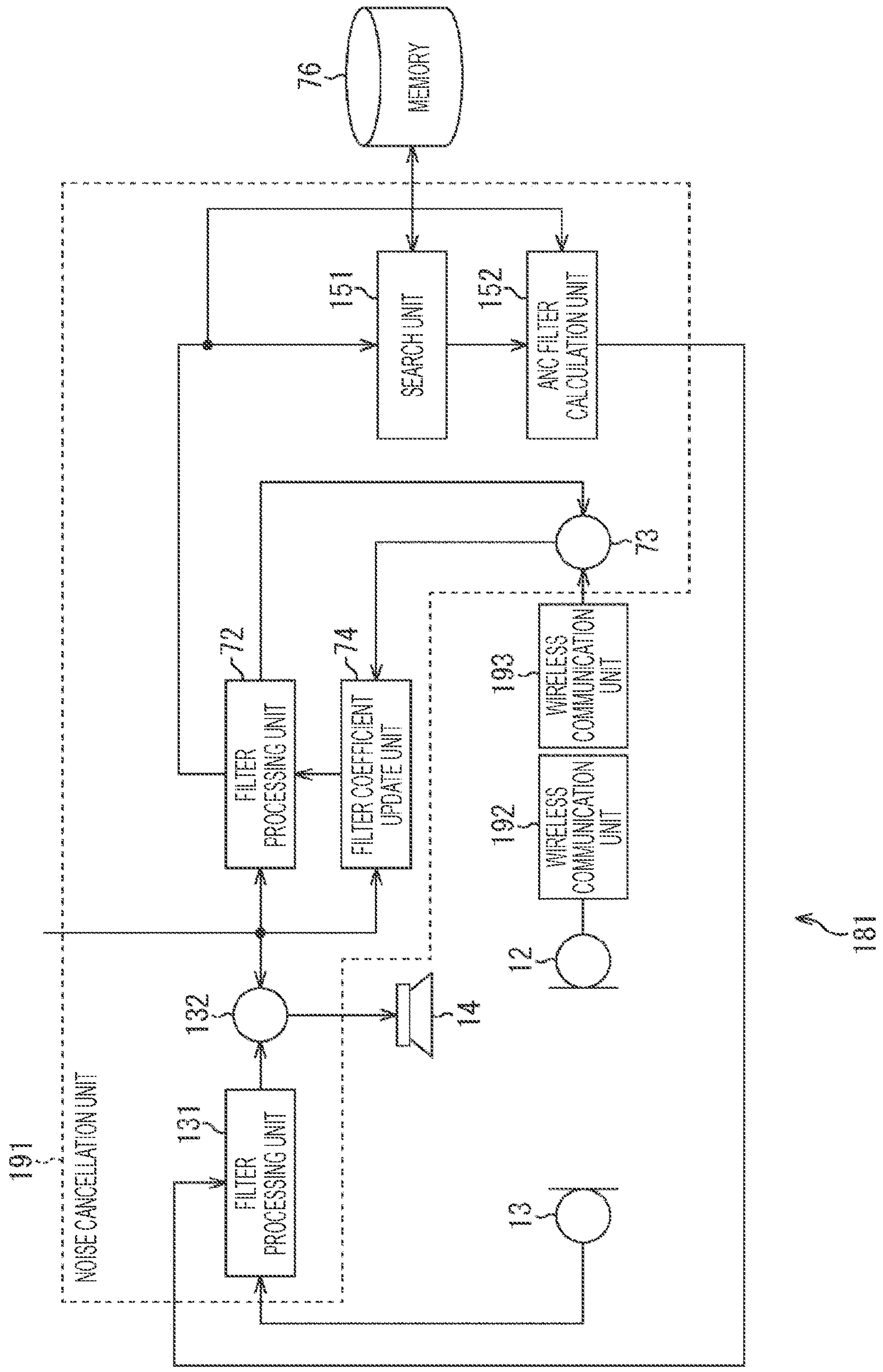
FIG. 11 is a diagram showing a configuration example of an ANC system.

FIG. 11 is a diagram showing a configuration example according to one embodiment of the ANC system to which the present technology is applied. Note that portions in FIG. 11 corresponding to those in FIG. 10 are denoted by the same reference signs, and the descriptions thereof will be omitted as appropriate.

An ANC system 181 illustrated in FIG. 11 includes, for example, a noise cancellation signal generation device provided in an automobile on which a user rides, an ear hole open type device worn by the user, and the like. The ANC system 181 performs feedforward ANC using road noise of an automobile as a noise sound to be canceled out.

The ANC system 181 has a reference sensor 13, a noise cancellation unit 191, a speaker 14, a control point microphone 12, a wireless communication unit 192, a wireless communication unit 193, and a memory 76.

In this example, for example, the control point microphone 12 and the wireless communication unit 192 are provided in the ear hole open type device worn by the user.

On the other hand, for example, the reference sensor 13, the noise cancellation unit 191, the speaker 14, the wireless communication unit 193, and the memory 76 are provided in an automobile.

In an ANC system 181, the reference sensor 13, the noise cancellation unit 191, the speaker 14, the wireless communication unit 193, and the memory 76 constitute a noise cancellation signal generation device that implements ANC.

The noise cancellation unit 191 includes, for example, a noise cancellation processor and the like and has a filter processing unit 131, an arithmetic unit 132, a filter processing unit 72, an arithmetic unit 73, a filter coefficient update unit 74, a search unit 151, and an ANC filter calculation unit 152.

For example, the noise cancellation processor executes a program to implement each unit of the noise cancellation unit 191.

The wireless communication unit 192 transmits the microphone signal v supplied from the control point microphone 12 to the noise cancellation signal generation device by wireless communication.

Furthermore, the wireless communication unit 193 of the noise cancellation signal generation device receives the microphone signal v sent by the wireless communication unit 192 and supplies the microphone signal v to the arithmetic unit 73.

Note that, herein, in order to simplify the description, the system configuration of the ANC system 181 in a case where there is one control point will be described, but in practice, the positions of both the left and right ears of the user are assumed as control points. In such a case, the control point microphone 12 is provided for each control point, and the ANC processing is performed for each control point. Furthermore, a plurality of reference sensors 13 is actually provided.

Description of Pre-Measurement Processing

Next, a flow of processings performed by the measurement device described with reference to FIG. 7 and the ANC system 181 illustrated in FIG. 11 will be described.

First, the measurement device performs pre-measurement processing of obtaining and recording the transmission characteristic S and the transmission characteristic M in advance. This pre-measurement processing corresponds to the processing of step STP1 described above.

Figure 12:
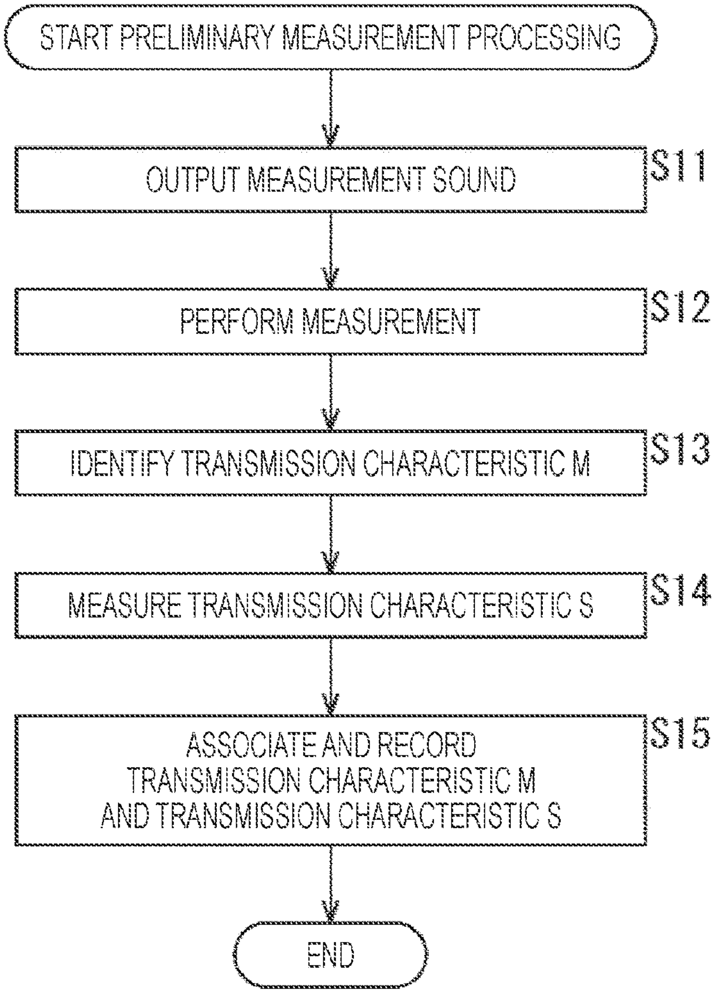
FIG. 12 is a flowchart illustrating the preliminary measurement processing.

Hereinafter, the preliminary measurement processing performed by the measurement device will be described with reference to the flowchart of FIG. 12.

In step S11, the speaker 14 outputs the measurement sound on the basis of the measurement signal uncorrelated with the measurement target of the reference sensor 13 or the measurement signal uncorrelated with the road noise.

In step S12, the reference sensor 13 and the control point microphone 12 perform measurement.

That is, the reference sensor 13 measures the acceleration for the road noise and supplies the reference signal x obtained as a result to the identification unit 71. Furthermore, the control point microphone 12 collects ambient sound and supplies a microphone signal v obtained as a result to the identification unit 71 and the arithmetic unit 73.

In step S13, the identification unit 71 identifies the transmission characteristic M by the actual operation TPA or the like on the basis of the reference signal x supplied from the reference sensor 13 and the microphone signal v supplied from the control point microphone 12, and supplies the obtained transmission characteristic M to the recording control unit 75.

In step S14, the filter processing unit 72 to the filter coefficient update unit 74 measure the transmission characteristic S.

That is, the filter processing unit 72 performs filter processing on the supplied measurement signal on the basis of the filter coefficient of the transmission characteristic S supplied from the filter coefficient update unit 74, and supplies a filter signal obtained as a result to the arithmetic unit 73.

Furthermore, the arithmetic unit 73 generates a differential signal from the microphone signal v supplied from the control point microphone 12 and the filter signal supplied from the filter processing unit 72, and supplies the differential signal to the filter coefficient update unit 74.

The filter coefficient update unit 74 updates the filter coefficient of the transmission characteristic S on the basis of the supplied measurement signal and the differential signal supplied from the arithmetic unit 73, and supplies the filter coefficient to the filter processing unit 72.

The filter processing unit 72 to the filter coefficient update unit 74 repeatedly perform these processings to obtain the transmission characteristic S. The filter processing unit 72 supplies the finally obtained transmission characteristic S to the recording control unit 75.

In step S15, the recording control unit 75 supplies the transmission characteristic M supplied from the identification unit 71 and the transmission characteristic S supplied from the filter processing unit 72 to the memory 76 in association with each other, and records the transmission characteristic M and the transmission characteristic S as a database.

In the measurement device, while moving the control point microphone 12 (control point) to each position within the movable range of the head of the user, the processings of steps S11 to S15 described above are performed for each position.

Then, when the transmission characteristic M and the transmission characteristic S are recorded in the memory 76 in association with each position within the movable range of the head of the user, the preliminary measurement processing ends.

As described above, the measurement device obtains the transmission characteristic M and the transmission characteristic S in advance before the ANC operates and records the transmission characteristic M and the transmission characteristic S in the memory 76. In this way, the ANC filter H at any head position of the user can be obtained, and the noise reduction performance can be improved.

Description of ANC Processing

Furthermore, when an instruction on execution of the ANC of the feedforward method is given at any timing, the ANC system 181 performs the ANC processing corresponding to steps STP2 and STP3 described above. Hereinafter, the ANC processing performed by the ANC system 181 will be described with reference to the flowchart in FIG. 13.

In step S41, the reference sensor 13 and the control point microphone 12 perform measurement.

That is, the reference sensor 13 measures the acceleration corresponding to the road noise and supplies the reference signal x obtained as a result to the filter processing unit 131.

The control point microphone 12 collects ambient sound and supplies the obtained microphone signal v to the wireless communication unit 192. The wireless communication unit 192 sends the microphone signal v supplied from the control point microphone 12 by wireless communication. Furthermore, the wireless communication unit 193 receives the microphone signal v sent by the wireless communication unit 192 and supplies the microphone signal v to the arithmetic unit 73.

In step S42, the filter processing unit 72 to the filter coefficient update unit 74 measure the transmission characteristic S'. That is, in step S42, processing similar to that in step S14 in FIG. 12 is performed to measure the transmission characteristic S'.

When the transmission characteristic S' is obtained by the measurement, the filter processing unit 72 supplies the obtained transmission characteristic S' to the search unit 151 and the ANC filter calculation unit 152.

In step S43, the search unit 151 searches for the transmission characteristic M associated with the transmission characteristic S closest to the transmission characteristic S' supplied from the filter processing unit 72 from among the transmission characteristics M recorded in the memory 76, and supplies the resultant transmission characteristic M to the ANC filter calculation unit 152.

In step S44, the ANC filter calculation unit 152 updates the ANC filter H by calculating the ANC filter H' by calculating the above-described Formula (5) on the basis of the transmission characteristic S' supplied from the filter processing unit 72 and the transmission characteristic M supplied from the search unit 151. The ANC filter calculation unit 152 supplies the updated ANC filter H' to the filter processing unit 131.

In step S45, the filter processing unit 131 generates a noise cancellation signal y by performing filter processing on the reference signal x supplied from the reference sensor 13 on the basis of the filter coefficient of the ANC filter H' supplied from the ANC filter calculation unit 152, and supplies the noise cancellation signal y to the arithmetic unit 132. The arithmetic unit 132 adds the noise cancellation signal y supplied from the filter processing unit 131 and the supplied content signal, and supplies the result to the speaker 14.

In step S46, the speaker 14 reproduces sound on the basis of the signal supplied from the arithmetic unit 132. As a result, the sound of the contents is reproduced by the speaker 14, and the road noise which is the noise sound is canceled out by the cancellation sound. That is, noise reduction is realized simultaneously with reproduction of contents.

In step S47, the ANC system 181 determines whether or not to end the processing. For example, in a case where an instruction to stop the ANC operation is given by manipulation of a user or the like, it is determined to end the processing.

In a case where it is determined in step S47 that the processing is not yet ended, the processing returns to step S41, and the above-described processings are repeatedly performed.

On the other hand, in a case where it is determined in step S47 that the processing is to be ended, each unit of the ANC system 181 stops the operation for the ANC, and the ANC processing is ended.

As described above, the ANC system 181 measures the transmission characteristic S' in real time, obtains an appropriate ANC filter H' on the basis of the transmission characteristic S' obtained by the measurement and the transmission characteristic M obtained in advance, and reduces the noise sound. By doing so, the noise reduction performance in the feedforward ANC can be improved.

Modification Examples of First Embodiment

About ANC

Note that the example of calculating the ANC filter H' on the basis of the transmission characteristic S' obtained during the ANC operation and the transmission characteristic M corresponding to the transmission characteristic S' has been described above.

However, the present invention is not limited thereto, and the transmission characteristic S and the ANC filter H obtained from the transmission characteristic S may be recorded in association with each other, and the ANC filter H recorded in association with the transmission characteristic S closest to the transmission characteristic S' may be read out and used during the ANC operation.

Figure 14:
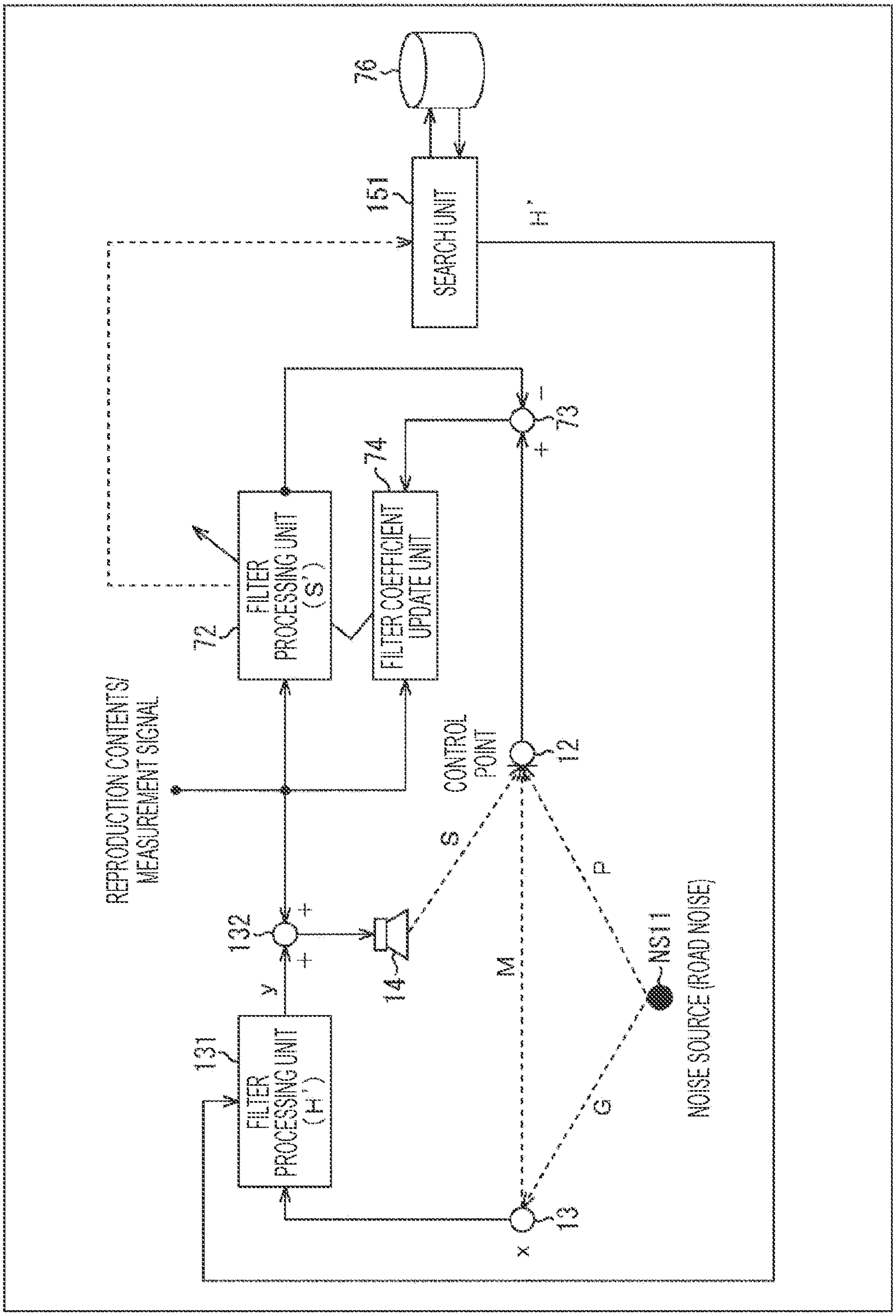
FIG. 14 is a diagram for explaining updating of an ANC filter during an ANC operation.

In such a case, for example, as illustrated in FIG. 14, the transmission characteristic S and the ANC filter H are associated with each other and recorded in the memory 76 as a database. Note that portions in FIG. 14 corresponding to those in FIG. 10 are denoted by the same reference signs, and the descriptions thereof will be omitted as appropriate.

In the example illustrated in FIG. 14, in step STP1 described above, the transmission characteristic M and the transmission characteristic S are obtained for each position within the movable range of the head of the user U11, further, the calculation of Formula (5) described above is performed on the basis of the transmission characteristic M and the transmission characteristic S, and the ANC filter H is obtained.

Then, when the transmission characteristic M, the transmission characteristic S, and the ANC filter H are obtained for each position within the movable range of the head of the user U11 in this manner, the transmission characteristic S and the ANC filter H among them are associated for each position and recorded in the memory 76.

Therefore, in the example of FIG. 14, during the operation of the ANC, the updated ANC filter H' can be obtained only by referring to the memory 76 and searching for the ANC filter H corresponding to the transmission characteristic S' without performing the calculation of the Formula (5) as in the example illustrated in FIG. 10.

That is, in this case, the search unit 151 searches for the ANC filter H associated with the transmission characteristic S closest to the transmission characteristic S' supplied from the filter processing unit 72 from among the transmission characteristic S and the ANC filter H recorded in association with the memory 76.

Then, the search unit 151 reads out the ANC filter H obtained by the search from the memory 76 as the updated ANC filter H' and supplies the ANC filter H to the filter processing unit 131.

As described above, by directly reading out the ANC filter H' from the memory 76, the calculation for obtaining the ANC filter H during the operation of the ANC can be omitted, the amount of calculation can be reduced accordingly, and not only calculation amount is reduced accordingly, but also the following performance with respect to the movement of the head of the user U11 can be improved.

Configuration Example of ANC System

Figure 15:
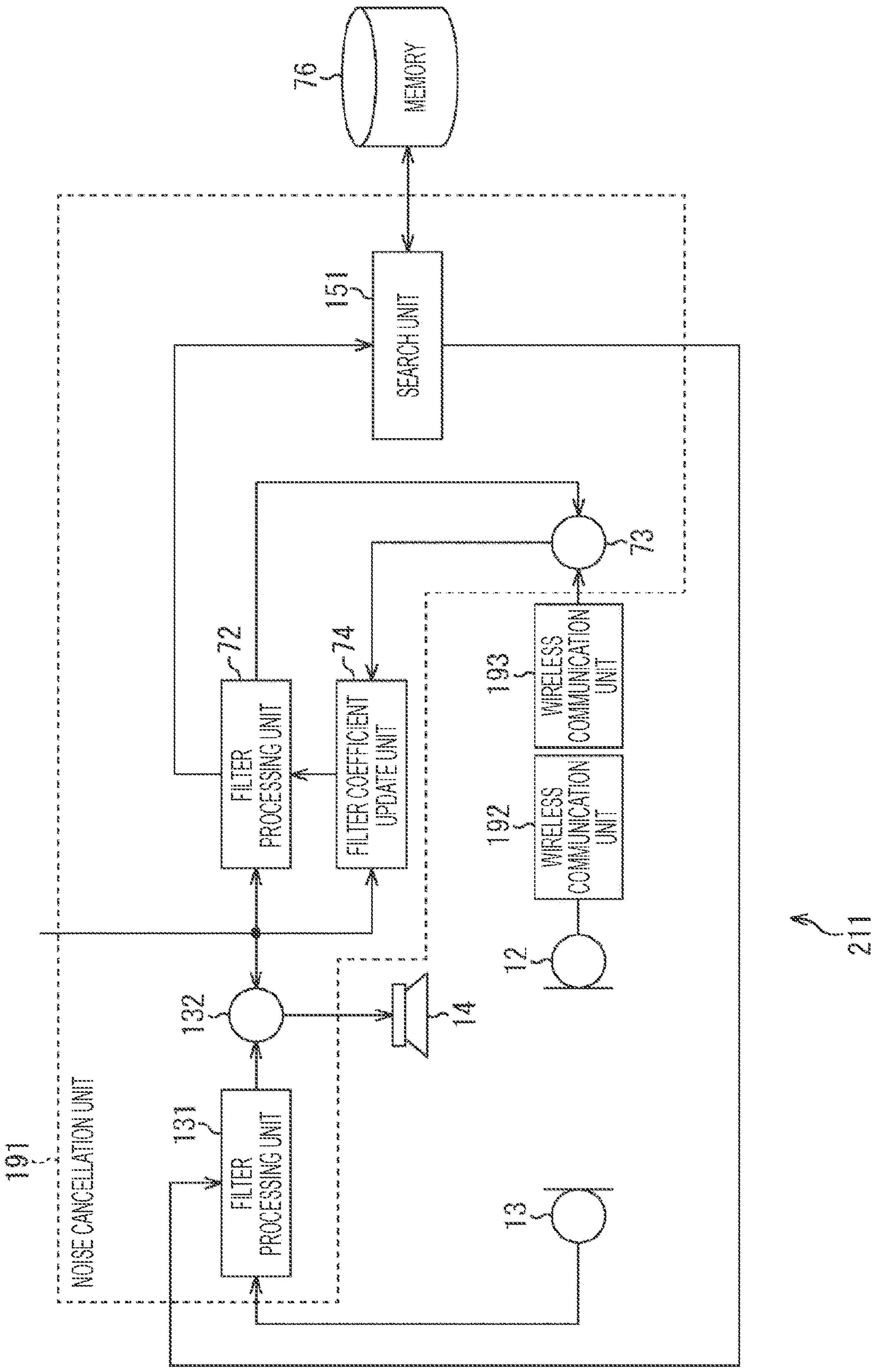
FIG. 15 is a diagram showing a configuration example of the ANC system.

In a case where the ANC filter H' corresponding to the transmission characteristic S' obtained by the measurement is directly read out from the memory 76 in this manner, the ANC system is configured as illustrated in FIG. 15. Note that portions in FIG. 15 corresponding to those in FIG. 11 are denoted by the same reference signs, and the descriptions thereof will be omitted as appropriate.

An ANC system 211 illustrated in FIG. 15 has a reference sensor 13, a noise cancellation unit 191, a speaker 14, a control point microphone 12, a wireless communication unit 192, a wireless communication unit 193, and a memory 76.

Furthermore, in the ANC system 211, the noise cancellation unit 191 has a filter processing unit 131, an arithmetic unit 132, a filter processing unit 72, an arithmetic unit 73, a filter coefficient update unit 74, and a search unit 151.

The configuration of the ANC system 211 is different from that of the ANC system 181 in that the ANC filter calculation unit 152 is not provided, and is the same as that of the ANC system 181 in other points. However, in the memory 76, the ANC filter H is recorded in association with the transmission characteristic S.

The search unit 151 searches for the ANC filter H associated with the transmission characteristic S closest to the transmission characteristic S' supplied from the filter processing unit 72 from among the ANC filters H recorded in the memory 76, and supplies the ANC filter H to the filter processing unit 131.

Description of ANC Processing

Figure 16:
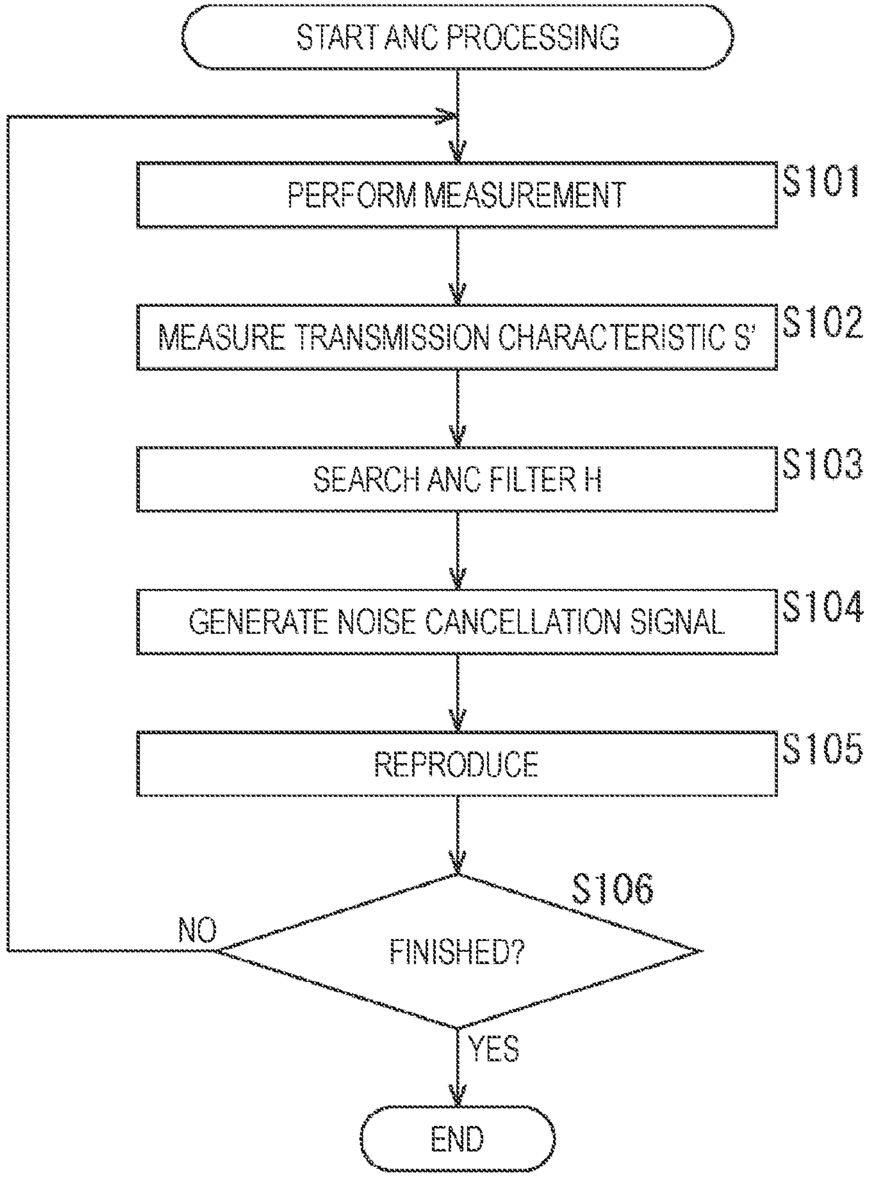
FIG. 16 is a flowchart illustrating the ANC processing.

Next, ANC processing by the ANC system 211 will be described with reference to a flowchart in FIG. 16.

Figure 13:
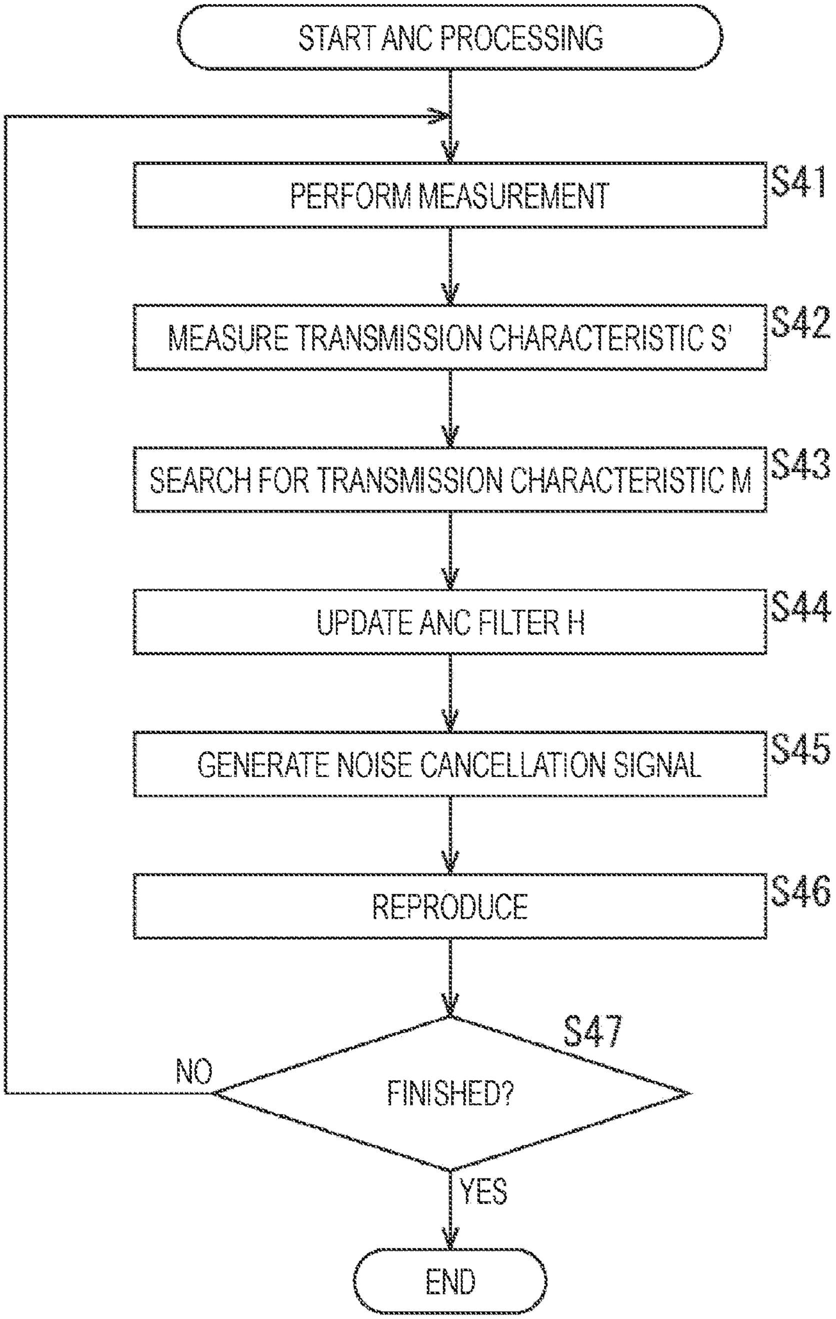
FIG. 13 is a flowchart illustrating the ANC processing.

Note that processings in steps S101 and S102 are similar to the processings in steps S11 and S12 in FIG. 13 so that descriptions thereof will be omitted. However, in step S102, the filter processing unit 72 supplies the obtained transmission characteristic S' to the search unit 151.

In step S103, the search unit 151 searches for the ANC filter H associated with the transmission characteristic S closest to the transmission characteristic S' supplied from the filter processing unit 72 from among the ANC filters H recorded in the memory 76.

Then, the search unit 151 reads out the ANC filter H obtained by the search from the memory 76 as the updated ANC filter H' and supplies the ANC filter H to the filter processing unit 131.

When the ANC filter H' is obtained in this manner, the processings of steps S104 to S106 are then performed, and the ANC processing ends, but since these processings are similar to the processings of steps S45 to S47 in FIG. 13, the description thereof will be omitted.

As described above, the ANC system 211 measures the transmission characteristic S' in real time and reads out the appropriate ANC filter H' on the basis of the transmission characteristic S' obtained by the measurement to reduce the noise sound.

By doing so, the noise reduction performance in the feedforward ANC can be improved. In particular, in this case, since the calculation for obtaining the ANC filter H' during the ANC operation is unnecessary, the ANC can be quickly performed with a smaller amount of calculation.

Modification Example 2 of First Embodiment

Configuration Example of ANC System

Furthermore, although the example in which the database in which the transmission characteristic M and the transmission characteristic S are associated with each other is recorded (held) in the memory 76 of the noise cancellation signal generation device has been described above, the database may be recorded in an external device such as a cloud server.

Figure 17:
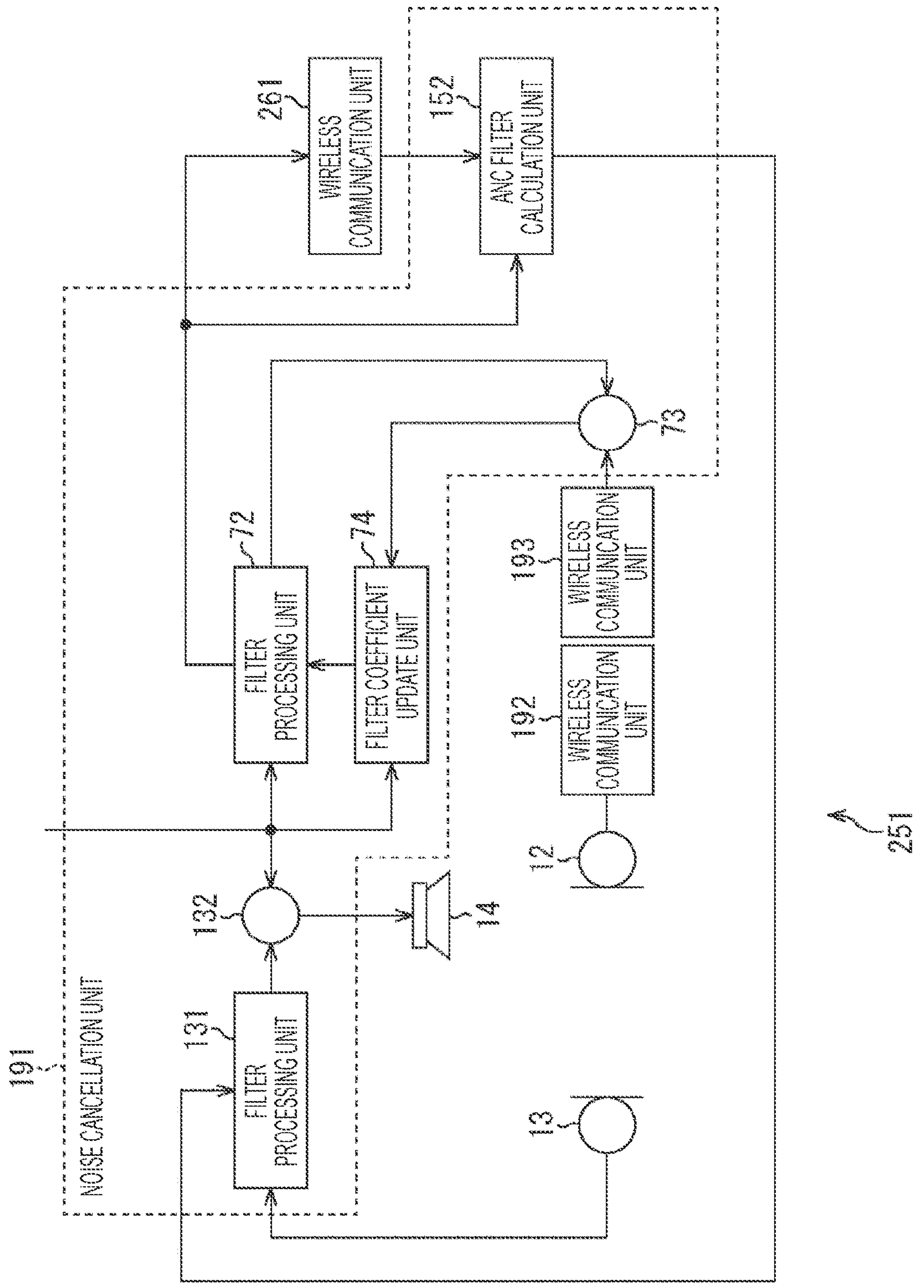
FIG. 17 is a diagram showing a configuration example of an ANC system.

In such a case, an ANC system is configured as illustrated in FIG. 17, for example. Note that portions in FIG. 17 corresponding to those in FIG. 11 are denoted by the same reference signs, and the descriptions thereof will be omitted as appropriate.

An ANC system 251 illustrated in FIG. 17 has a reference sensor 13, a noise cancellation unit 191, a speaker 14, a control point microphone 12, a wireless communication unit 192, a wireless communication unit 193, and a wireless communication unit 261.

Furthermore, in the ANC system 251, the noise cancellation unit 191 has a filter processing unit 131, an arithmetic unit 132, a filter processing unit 72, an arithmetic unit 73, a filter coefficient update unit 74, and an ANC filter calculation unit 152.

The configuration of this ANC system 251 is different from that of the ANC system 181 in that the search unit 151 is not provided, and a wireless communication unit 261 is newly provided. Other than those, the configuration of the ANC system 251 is the same as that of the ANC system 181.

The wireless communication unit 261 functions as an acquisition unit that acquires the transmission characteristic M on the basis of the transmission characteristic S', that is, the microphone signal v. That is, the wireless communication unit 261 sends a sending request including the transmission characteristic S' supplied from the filter processing unit 72 and requesting sending of the transmission characteristic M to the server (not illustrated) by wireless communication.

A database in which the transmission characteristic M and the transmission characteristic S are associated with each other is held in the server, and when receiving the sending request sent by the wireless communication unit 261, the server sends the transmission characteristic M corresponding to the transmission characteristic S' included in the sending request. Note that the wireless communication unit 193 may perform wireless communication with the server to acquire the transmission characteristic M.

The wireless communication unit 261 receives the transmission characteristic M sent from the server and supplies the received transmission characteristic M to the ANC filter calculation unit 152.

The ANC filter calculation unit 152 calculates the ANC filter H' on the basis of the transmission characteristic S' supplied from the filter processing unit 72 and the transmission characteristic M supplied from the wireless communication unit 261, and supplies the ANC filter H' to the filter processing unit 131.

Note that, herein, the example has been described in which the wireless communication unit 261 acquires the transmission characteristic M by receiving the transmission characteristic M sent in response to the sending request, but similarly to the case in FIG. 14, the ANC filter H' corresponding to the transmission characteristic S' may be acquired from the server.

In such a case, the wireless communication unit 261 receives the ANC filter H' sent from the server in response to the sending request and supplies the ANC filter H' to the filter processing unit 131.

Description of ANC Processing

Figure 18:
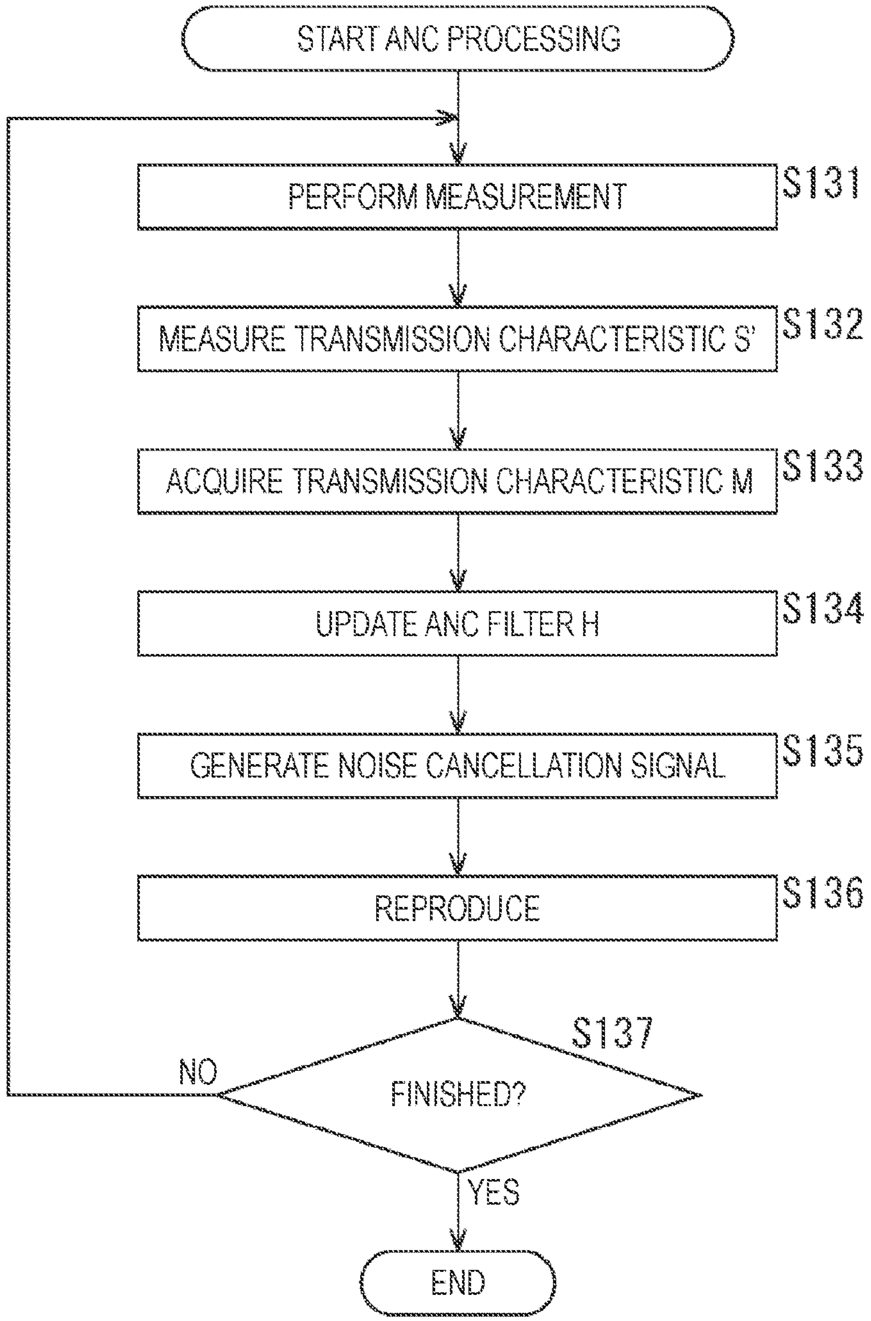
FIG. 18 is a flowchart illustrating the ANC processing.

Next, ANC processing by the ANC system 251 will be described with reference to a flowchart in FIG. 18.

Note that processings in steps S131 and S132 are similar to the processings in steps S41 and S42 in FIG. 13 so that descriptions thereof will be omitted.

However, in step S132, the filter processing unit 72 supplies the obtained transmission characteristic S' to the wireless communication unit 261 and the ANC filter calculation unit 152.

In step S133, the wireless communication unit 261 acquires the transmission characteristic M.

That is, the wireless communication unit 261 sends a sending request including the transmission characteristic S' supplied from the filter processing unit 72 to the server (not illustrated) by wireless communication. Then, the transmission characteristic M associated with the transmission characteristic S closest to the transmission characteristic S' searched from the database is sent from the server.

The wireless communication unit 261 receives the transmission characteristic M sent from the server and supplies the received transmission characteristic M to the ANC filter calculation unit 152.

Once the transmission characteristic M is acquired, the processings in steps S134 to S137 are performed thereafter, and the ANC processing ends. These processings are similar to the processings in steps S44 to S47 in FIG. 13 so that descriptions thereof will be omitted.

However, in step S134, the ANC filter H' is obtained using the transmission characteristic S' obtained in step S132 and the transmission characteristic M obtained in step S133.

As described above, the ANC system 251 measures the transmission characteristic S' in real time, acquires the transmission characteristic M on the basis of the transmission characteristic S' obtained by the measurement, and obtains the ANC filter H' from the obtained transmission characteristic M and transmission characteristic S'.

By doing so, the noise reduction performance in the feedforward ANC can be improved.

Second Embodiment

About ANC

Moreover, in a case where the head position of the user, in particular, the position of the ear in the head can be specified in the ANC system, the feedforward ANC following the movement of the head of the user can be realized by performing processings of the following three steps STP1' to STP3'.

(Step STP1')

Before the ANC is operated, the ear position coordinate information indicating the positions of the left and right ears of the user in the movable range of the head of the user, the transmission characteristic M from the reference point to the control point, and the transmission characteristic S as the secondary transmission characteristic are obtained by preliminary measurement, and the ear position coordinate information, the transmission characteristic M, and the transmission characteristic S are stored as a database in association with one another.

(Step STP2')

The ear position coordinate information indicating the position of the ear of the user is obtained by the measurement during the operation of the ANC.

(Step STP3')

The ear position coordinate information closest to the ear position coordinate information obtained in step STP2' is searched from the database generated in step STP1', and the ANC filter H is updated using the transmission characteristic S and the transmission characteristic M associated with the ear position coordinate information obtained by the search.

Herein, the position of the user's ear indicated by the ear position coordinate information is the position of the control point which is the noise cancellation point. The ear position coordinate information indicating the ear position of the user may be any information such as coordinates of a three-dimensional orthogonal coordinate system or coordinates of a spherical coordinate system.

Furthermore, in the database, the ear position coordinate information, the transmission characteristic S, and the transmission characteristic M are recorded in association with each of the left and right ears of the user.

As a method of obtaining the ear position coordinate information, for example, the following method can be considered.

That is, as one method, for example, a method is conceivable in which a position measurement sensor such as an acceleration sensor, an angular velocity sensor, or a magnetic sensor is attached to the user's head, and the movement of the user's head is detected by the position measurement sensor. For example, these position measurement sensors may be arranged in the vicinity of the control point.

In this method, ear position coordinate information indicating the head position of the user, more specifically, the positions of the left and right ears of the user are calculated for each of the left and right ears on the basis of the integrated value of the output signals of the position measuring sensor.

At this time, in order to prevent accumulation of errors due to integration of output signals of the position measurement sensor, an infrared sensor or the like for detecting the absolute position of the user's head or ear may be used in combination with the above-described position measurement sensor.

Furthermore, as another method of obtaining the ear position coordinate information, for example, a method of photographing the head of the user with a camera, that is, an image sensor, and specifying the positions of the left and right ears of the user by image analysis on the photographed image obtained by the photographing is also conceivable.

In such a case, in order to obtain more accurate ear position coordinate information, a marker indicating the position of the ear may be worn on the ear portion of the user, or the position of the ear hole open type device worn on the ear portion of the user may be specified by image recognition (image analysis), and the specified position may serve as the position of the ear of the user.

Moreover, the head of the user is simultaneously photographed by a plurality of cameras, and the position of the ear of the user is specified using the photographed image obtained for each of the cameras, so that the position of the ear can be specified more accurately.

In addition, a global positioning system (GPS) module or the like may be provided as a position measuring sensor in the vicinity of the ear position of the user as a control point, and the ear position coordinate information may be acquired by the GPS module or the like.

Furthermore, in step STP1', as described with reference to FIG. 8, it is not always necessary to simultaneously measure the transmission characteristic M from the reference point to the control point and the transmission characteristic S as the secondary transmission characteristic, and a database in which the ear position coordinate information and each transmission characteristic are separately associated may be constructed by the procedure illustrated in FIGS. 19 and 20.

Figure 19:
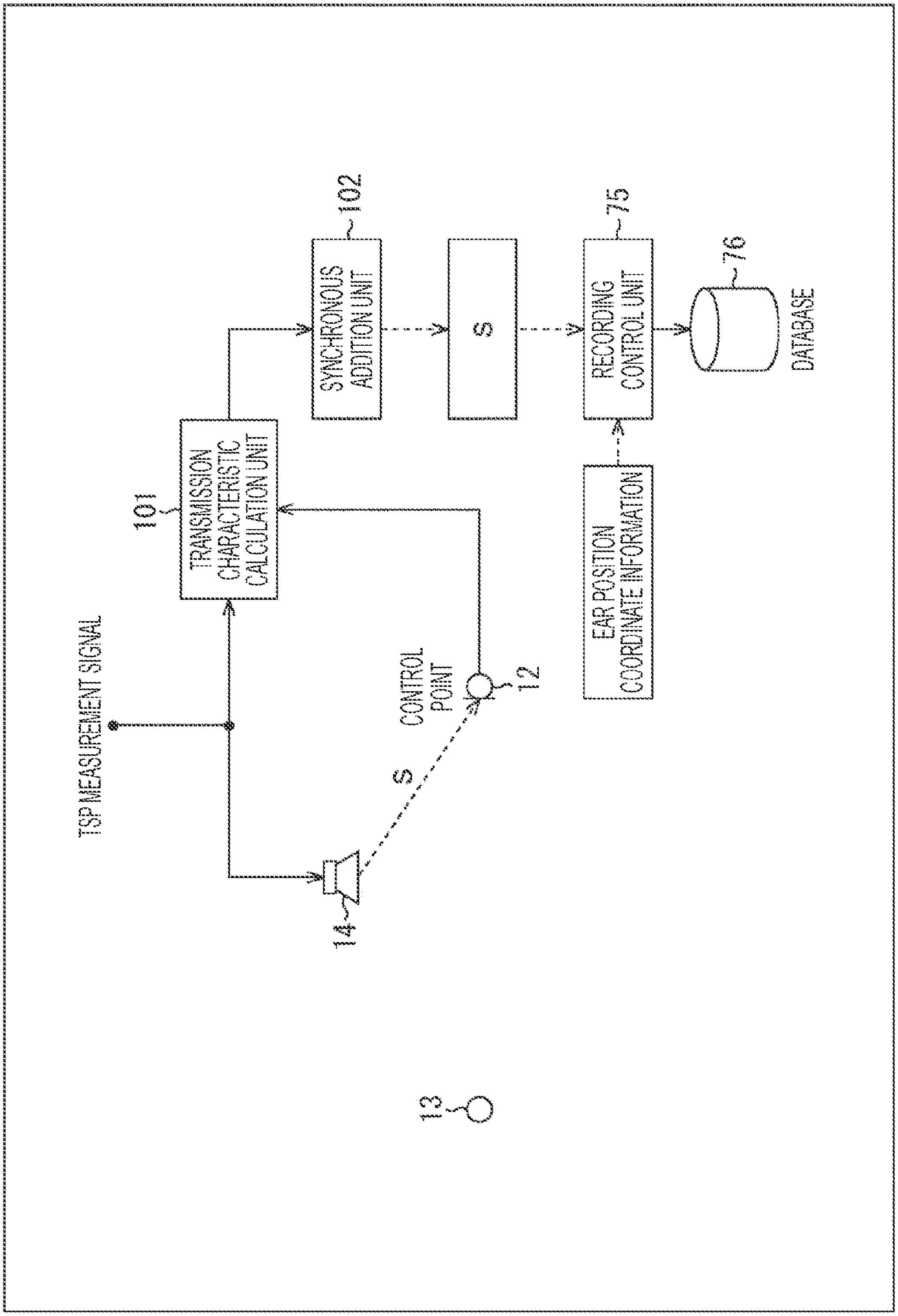
FIG. 19 is a diagram for explaining preliminary measurement of a transmission characteristic.
Figure 20:
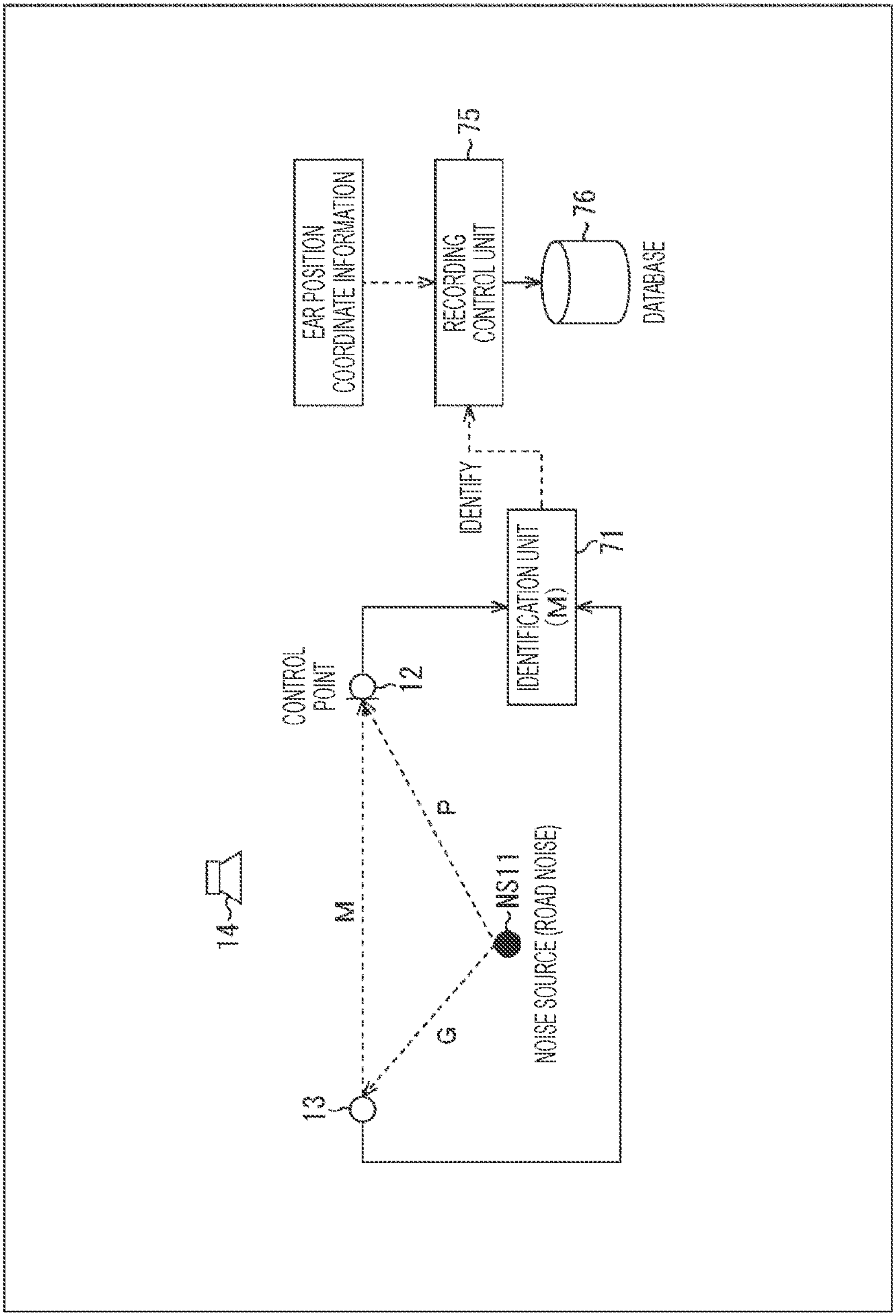
FIG. 20 is a diagram for explaining preliminary measurement of a transmission characteristic.

Note that portions in FIGS. 19 and 20 corresponding to those in FIG. 8 are denoted by the same reference signs, and the descriptions thereof will be omitted as appropriate.

First, as illustrated in FIG. 19, ear position coordinate information indicating the positions of the left and right ears of the user is obtained by measurement by some method, and a transmission characteristic S at the position indicated by the ear position coordinate information is obtained by measurement.

In this example, the measurement sound outputted from the speaker 14 on the basis of the TSP measurement signal is collected by the control point microphone 12, and the transmission characteristic S is obtained by the transmission characteristic calculation unit 101 on the basis of the microphone signal v obtained as a result and the TSP measurement signal.

Moreover, the synchronous addition unit 102 performs synchronous addition on the plurality of transmission characteristics S thus obtained, and the transmission characteristic S that is final secondary transmission characteristic is obtained. Note that the transmission characteristic S is obtained for each of the left and right ears.

Then, the obtained transmission characteristic S and the ear position coordinate information are associated with each other and recorded in the memory 76 by the recording control unit 75.

Furthermore, as illustrated in FIG. 20, ear position coordinate information indicating the positions of the left and right ears of the user is obtained by measurement in a similar manner to the case in FIG. 19.

At the same time, the identification unit 71 identifies the transmission characteristic M by the actual operation TPA or the like on the basis of the reference signal x obtained by the reference sensor 13 and the microphone signal v obtained by the control point microphone 12.

When the transmission characteristic M is obtained, the ear position coordinate information obtained by the measurement and the transmission characteristic M are associated with each other and recorded in the memory 76 by the recording control unit 75.

At this time, in a case where the transmission characteristic S has already been obtained, the ear position coordinate information, the transmission characteristic S, and the transmission characteristic M may be recorded in association with each other.

In this way, for each of the left and right ears, a database in which the ear position coordinate information, the transmission characteristic S, and the transmission characteristic M are associated with each other is obtained for each of a plurality of different ear positions.

Figure 21:
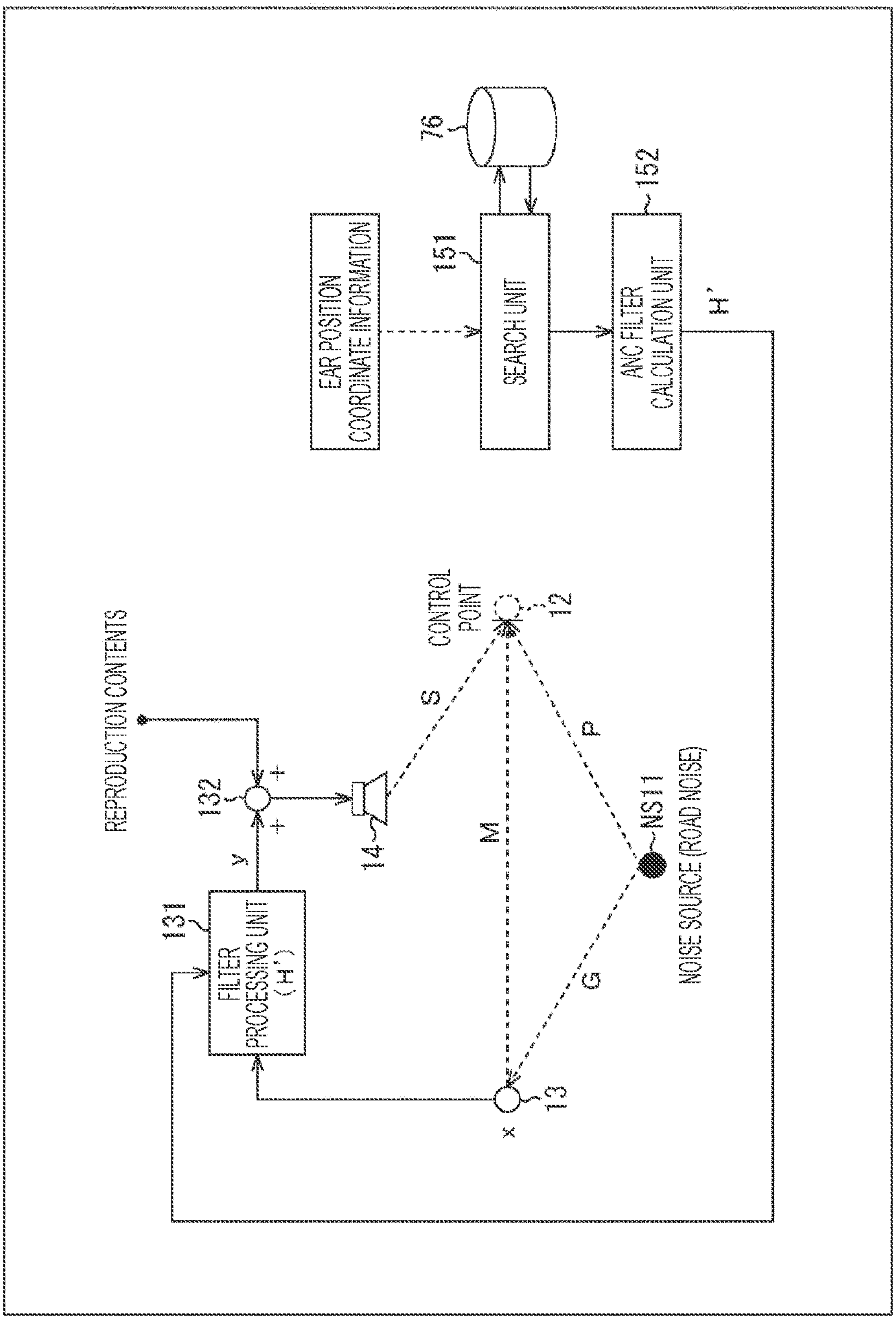
FIG. 21 is a diagram for explaining updating of an ANC filter during an ANC operation.

When the ear position coordinate information, the transmission characteristic S, and the transmission characteristic M are obtained as described above, for example, an appropriate ANC filter H can be obtained during the ANC operation as illustrated in FIG. 21. Note that portions in FIG. 21 corresponding to those in FIG. 10 are denoted by the same reference signs, and the descriptions thereof will be omitted as appropriate.

In the example illustrated in FIG. 21, ear position coordinate information indicating the positions of the left and right ears of the user is obtained by measurement as in the similar manner as in the case of FIGS. 19 and 20 during the ANC operation.

Then, the search unit 151 searches through the database on the basis of the obtained ear position coordinate information. That is, the search unit 151 searches for the transmission characteristic S and the transmission characteristic M associated with the ear position coordinate information closest to the ear position coordinate information indicating the current position of the user's ear from the transmission characteristic M and the transmission characteristic S recorded in the memory 76, and supplies the transmission characteristic S and the transmission characteristic M to the ANC filter calculation unit 152.

The ANC filter calculation unit 152 calculates the ANC filter H' by calculating the above-described Formula (5) on the basis of the transmission characteristic S and the transmission characteristic M supplied from the search unit 151.

In this example, since the ANC filter H' can be calculated from the transmission characteristic S and the transmission characteristic M obtained by the search, the microphone signal v obtained by the control point microphone 12 is unnecessary during the ANC operation.

Note that, in the example described with reference to FIG. 21, in a case where the transmission characteristic S' can be obtained during the ANC operation, the transmission characteristic S and the transmission characteristic M may be obtained by performing a search in a database using the transmission characteristic S' as a key.

In this case, even if the ear position coordinate information cannot be obtained for some reason, the appropriate transmission characteristic S and transmission characteristic M can be read out from the transmission characteristic S' obtained during the ANC operation, and the ANC filter H' can be obtained from the transmission characteristic S and the transmission characteristic M.

Furthermore, similarly to the example illustrated in FIG. 14, the ear position coordinate information and the ANC filter H may be recorded in the memory 76 as a database in association with each other.

Moreover, the noise cancellation signal generation device may send a sending request including the ear position coordinate information to the server, and acquire the transmission characteristic S and the transmission characteristic M according to the ear position coordinate information and the ANC filter H from the server.

Note that, in association with the ear position coordinate information with the transmission characteristic S and the transmission characteristic M, it is desirable that the resolution of the ear position coordinate information is sufficient in the movable range of the user's head.

However, in a case where a desired resolution cannot be obtained, such as a case where it takes insufficient time for measurement, data obtained by measurement may be interpolated to secure a sufficient resolution.

Figure 22:
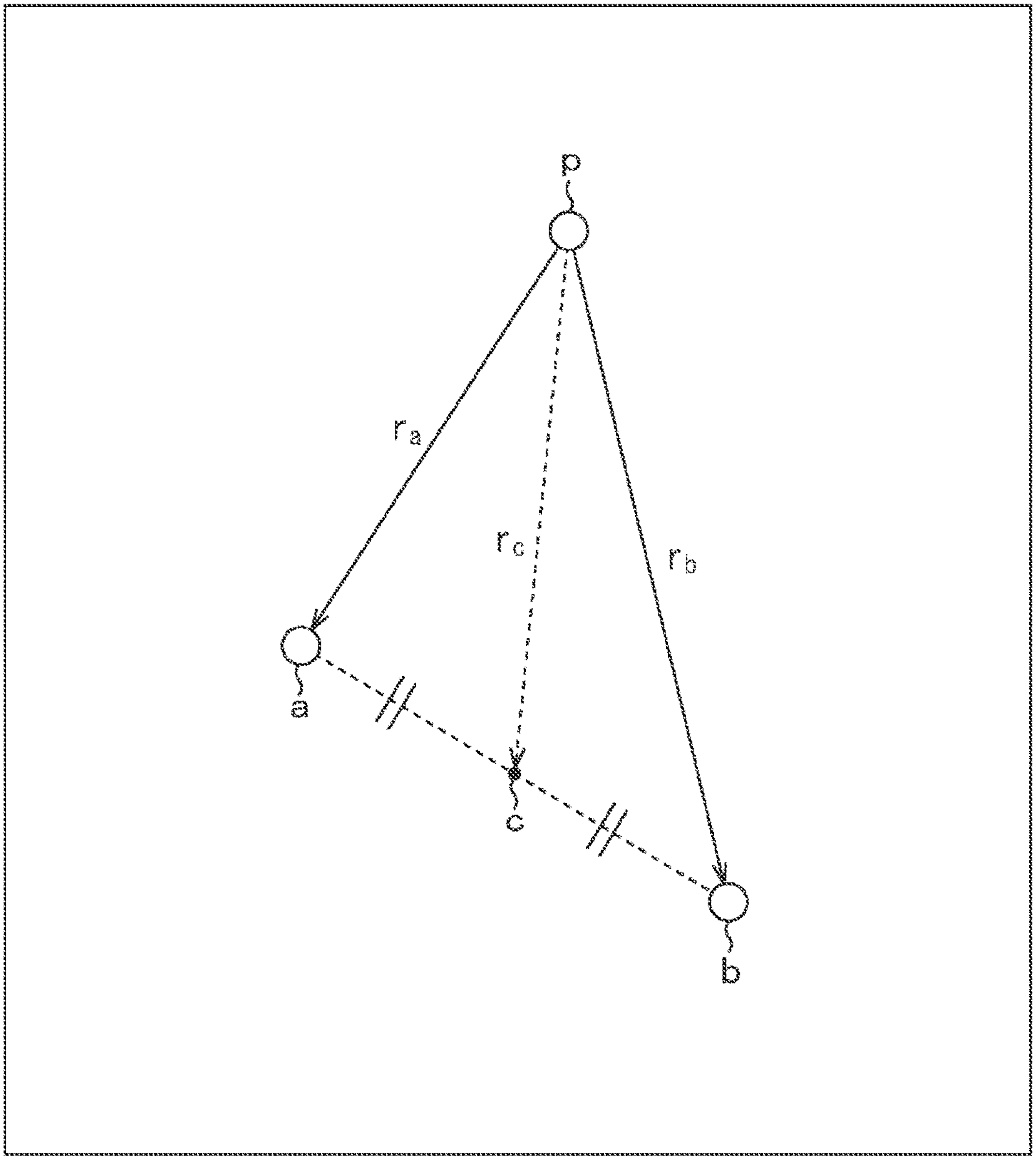
FIG. 22 is a diagram for explaining interpolation of transmission characteristics.

For example, as illustrated in FIG. 22, suppose that the position of the sound source is p, the positions of the measurement points are a and b, and the position between the position a and the position b is c.

In particular, herein, the position c is equidistant from the position a and the position b. That is, the position c is a midpoint of a line segment connecting the position a and the position b.

Moreover, suppose that distances from the position p to the position a, the position b, and the position c are $r_a$, $r_b$, and $r_c$, respectively.

In such a case, suppose that $g_a(t)$ and $g_b(t)$ are obtained as the transmission characteristic from the position p to the position a and the transmission characteristic from the position p to the position b by measurement at a predetermined time t.

At this time, suppose that predetermined delays (delay times) are $\tau_a$ and $\tau_b$ and suppose that there is a linear delay relationship expressed by the following Formula (6) between a certain transmission characteristic $g_0(t)$ and a transmission characteristic $g_a(t)$, and similarly, there is a linear delay relationship expressed by the following Formula (7) between the transmission characteristic $g_0(t)$ and the transmission characteristic $g_b(t)$.

[Formula 6]

$$g_a(t) \approx g_0(t-\tau_a) \tag{6}$$

[Formula 7]

$$g_b(t) \approx g_0(t-\tau_b) \tag{7}$$

When there is the relationship of the linear delay shown in such formulas (6) and (7), approximation using the transmission characteristic $g_0(t)$ can also be performed for the transmission characteristic $g_c(t)$ from the position p to the position c.

For example, for the transmission characteristic S that is a secondary transmission characteristic in which the coordinates of the sound source position corresponding to the position p are known, the distance $r_a$, the distance $r_b$, and the distance $r_c$ from the sound source position to the measurement point can be obtained by calculation.

For example, in the example shown in FIG. 22, the position p corresponds to the arrangement position of the speaker 14 that is the secondary sound source, and the position a, the position b, and the position c correspond to the control points.

Furthermore, since there is a linear delay relationship herein, that is, a relationship between the distance from the sound source and the delay is a proportional relationship, the following Formula (8) is established.

[Formula 8]

$$\tau_a \propto r_a$$

$$\tau_b \propto r_b \quad (8)$$

Therefore, by using these relationships between the distance and the linear delay, the delay $\tau_c$ for the position c can be obtained from the delay $\tau_a$ and the delay $\tau_b$, and the approximate value of the transmission characteristic $g_c(t)$ can be obtained by the following formula (9).

[Formula 9]

$$g_c(t) \approx g_0(t-\tau_c) \quad (9)$$

As described above, if the transmission characteristic S is obtained by measurement for the position a and the position b, the transmission characteristic S for the position c can be obtained by interpolation processing. Furthermore, for the transmission characteristic M, the transmission characteristic M of a desired control point can be obtained by similar interpolation processing.

Note that, in the case of the primary transmission characteristic (transmission characteristic P) in which the distance $r_a$, the distance $r_b$, and the distance $r_c$ from the position p of the sound source to the position a, the position b, and the position c of the measurement points are unknown, the delay $\tau_a$ and the delay $\tau_b$ cannot be directly obtained.

However, in a case where the distance from the position p as the noise source to the position a or the position b as the measurement points is sufficiently long, the following formula (10) is established.

[Formula 10]

$$r_c \approx \frac{r_a + r_b}{2} \quad (10)$$

Furthermore, a time difference between the delay $\tau_a$ and the delay $\tau_b$ is $\tau_{ab}$. Note that the time difference $\tau_{ab}$ is $\tau_{ab}=\tau_a-\tau_b$ or $\tau_{ab}=\tau b-\tau_a$ depending on the positional relationship between the sound source (position p) and the measurement point (position a, position b).

At this time, in a case where the relationship shown in the following formula (11) is established between the transmission characteristic $g_a(t)$ and the transmission characteristic $g_b(t)$, an approximate value of the transmission characteristic $g_c(t)$ can be obtained by the following formula (12).

[Formula 11]

$$g_a(t) \approx g_b(t-\tau_{ab}) \quad (11)$$

[Formula 12]

$$g_c(t) \approx g_0\left(t-\frac{\tau_{ab}}{2}\right) \quad (12)$$

Note that, in a case where the measurement of the transmission characteristic S and the identification of the transmission characteristic M are not simultaneously performed at the time of constructing the database described with reference to FIGS. 19 and 20, there may be a mismatch between the coordinates (ear position coordinate information) of the measurement point corresponding to each of the transmission characteristic S and the transmission characteristic M, that is, the control point.

In such a case, regarding the transmission characteristic S and the transmission characteristic M, if the transmission characteristic S and the transmission characteristic M are obtained by the above-described interpolation processing for some positions in the vicinity of the actually measured control point, it is possible to eliminate the mismatch between the control points of the transmission characteristic S and the transmission characteristic M. That is, it is possible to obtain appropriate transmission characteristics S and transmission characteristics M for each ear position coordinate information (control point).

Furthermore, although the interpolation processing using linear delay or the like has been described herein, any processing such as linear interpolation may be performed as the interpolation processing.

Configuration Example of ANC System

Next, as described with reference to FIG. 21, a configuration example of an ANC system that searches a database using ear position coordinate information as a key will be described.

Figure 23:
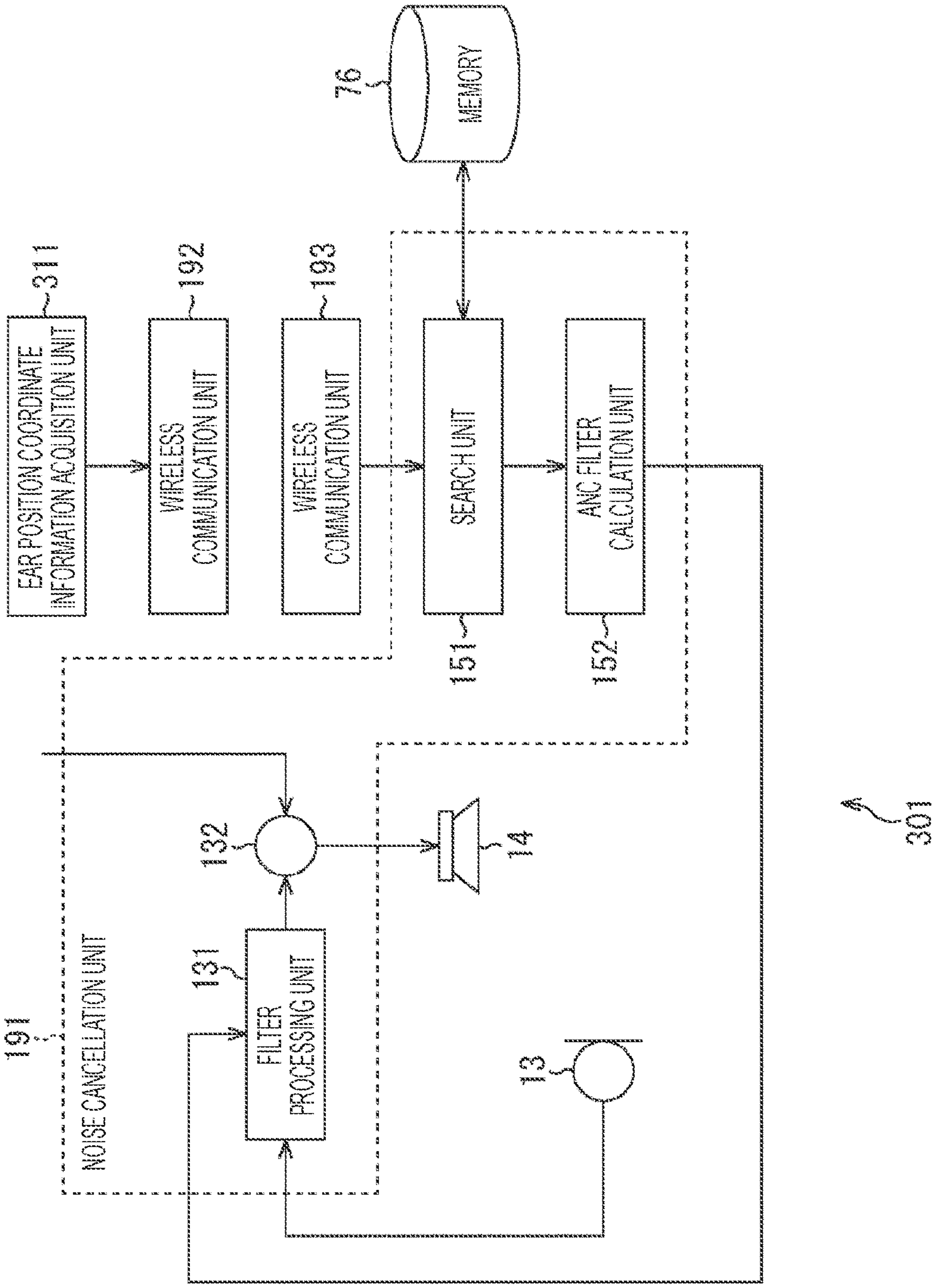
FIG. 23 is a diagram showing a configuration example of the ANC system.

In such a case, the ANC system is configured as illustrated in FIG. 23, for example. Note that portions in FIG. 23 corresponding to those in FIG. 11 are denoted by the same reference signs, and the descriptions thereof will be omitted as appropriate.

An ANC system 301 illustrated in FIG. 23 has a reference sensor 13, a noise cancellation unit 191, a speaker 14, an ear position coordinate information acquisition unit 311, a wireless communication unit 192, a wireless communication unit 193, and a memory 76.

Furthermore, in the ANC system 301, the noise cancellation unit 191 has a filter processing unit 131, an arithmetic unit 132, a search unit 151, and an ANC filter calculation unit 152.

The configuration of this ANC system 301 is different from the ANC system 181 in that the control point microphone 12, the filter processing unit 72, the arithmetic unit 73, and the filter coefficient update unit 74 are not provided, and the ear position coordinate information acquisition unit 311 is newly provided. Other than those, the configuration of the ANC system 301 is the same as the ANC system 181.

Particularly in the ANC system 301, the ear position coordinate information acquisition unit 311 and the wireless communication unit 192 are provided in the ear hole open type device worn on the ear portion of the user.

Furthermore, the remaining reference sensor 13, the noise cancellation unit 191, the speaker 14, the wireless communication unit 193, and the memory 76 are provided in an automobile, and these blocks constitute a noise cancellation signal generation device.

The ear position coordinate information acquisition unit 311 includes, for example, a position measurement sensor such as an acceleration sensor, an angular velocity sensor, or a magnetic sensor provided in the vicinity of the ear position of the user, which is a control point, and acquires the ear position coordinate information by detecting (measuring) the movement of the head of the user. That is, the ear position coordinate information acquisition unit 311 calculates the ear position coordinate information on the basis of the integrated value of the output signal of the position measurement sensor.

The ear position coordinate information acquisition unit 311 supplies the ear position coordinate information obtained by the measurement to the wireless communication unit 192. Note that the ear position coordinate information acquisition unit 311 may include a GPS module, a camera, or the like.

The wireless communication unit 192 sends the ear position coordinate information supplied from the ear position coordinate information acquisition unit 311 to the noise cancellation signal generation device by wireless communication.

Furthermore, the wireless communication unit 193 of the noise cancellation signal generation device receives the ear position coordinate information sent by the wireless communication unit 192 and supplies the ear position coordinate information to the search unit 151.

From the transmission characteristic M and the transmission characteristic S recorded in the memory 76, the search unit 151 searches for the transmission characteristic S and the transmission characteristic M associated with the ear position coordinate information closest to the ear position coordinate information supplied from the wireless communication unit 193, and supplies the transmission characteristic S and the transmission characteristic M to the ANC filter calculation unit 152.

The ANC filter calculation unit 152 calculates the ANC filter H' by calculating the above-described Formula (5) on the basis of the transmission characteristic S and the transmission characteristic M supplied from the search unit 151.

Description of ANC Processing

Figure 24:
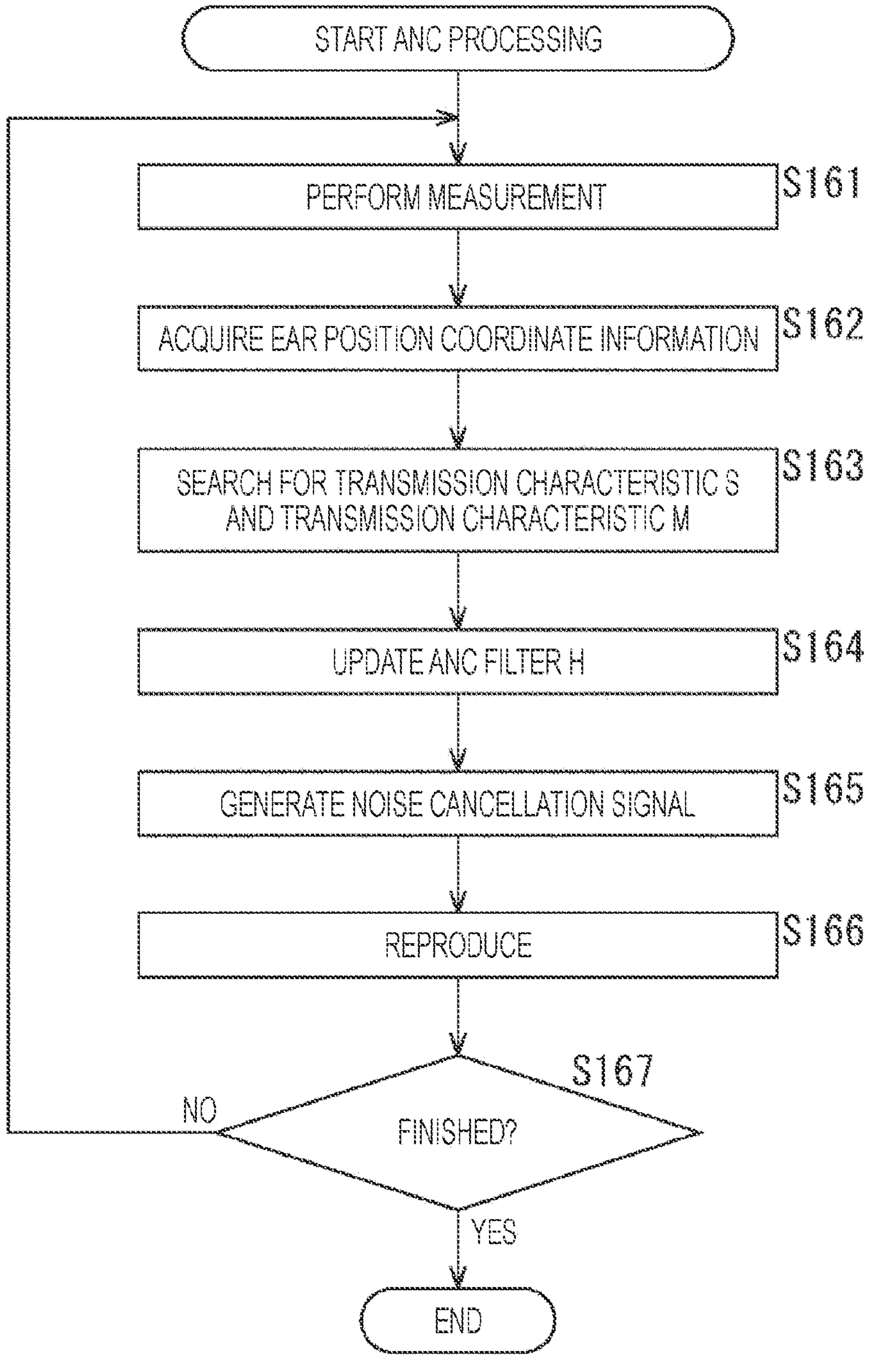
FIG. 24 is a flowchart illustrating the ANC processing.

Next, the ANC processing by the ANC system 301 will be described with reference to a flowchart in FIG. 24.

In step S161, the reference sensor 13 performs measurement.

That is, the reference sensor 13 measures the acceleration corresponding to the road noise and supplies the reference signal x obtained as a result to the filter processing unit 131.

In step S162, the ear position coordinate information acquisition unit 311 acquires the ear position coordinate information by detecting the movement of the head of the user, and supplies the ear position coordinate information to the wireless communication unit 192.

The wireless communication unit 192 sends, by wireless communication, the ear position coordinate information supplied from the ear position coordinate information acquisition unit 311, and the wireless communication unit 193 receives the ear position coordinate information sent by the wireless communication unit 192 and supplies the ear position coordinate information to the search unit 151.

In step S163, the search unit 151 searches for the transmission characteristic S and the transmission characteristic M on the basis of the ear position coordinate information supplied from the wireless communication unit 193.

That is, from the transmission characteristic M and the transmission characteristic S recorded in the memory 76, the search unit 151 searches for the transmission characteristic S and the transmission characteristic M associated with the ear position coordinate information closest to the ear position coordinate information supplied from the wireless communication unit 193.

The search unit 151 reads out the transmission characteristics S and the transmission characteristics M obtained as a result of the search from the memory 76 and supplies the transmission characteristic S and the transmission characteristic M to the ANC filter calculation unit 152.

When the transmission characteristic S and the transmission characteristic M are found, the processings of steps S164 to S167 are then performed and the ANC processing ends, but since these processings are similar to the processings of steps S44 to S47 in FIG. 13, the description thereof will be omitted.

However, in step S164, the ANC filter H' is obtained using the transmission characteristic S and the transmission characteristic M obtained in step S163.

As described above, the ANC system 301 acquires the transmission characteristic S and the transmission characteristic M on the basis of the ear position coordinate information and obtains the ANC filter H'. By doing so, the noise reduction performance in the feedforward ANC can be improved.

Note that, also in the ANC system 301, similarly to the case of the ANC system 251, the transmission characteristics S and the transmission characteristics M may be acquired from an external device (server) by wireless communication.

In such a case, the wireless communication unit 261 is only required to send a sending request including the ear position coordinate information to the server and receive the transmission characteristic S and the transmission characteristic M sent from the server in response to the sending request.

Moreover, an example in which the ANC system is applied to an automobile has been described above, but the present technology can be applied not only to an automobile, but also to all moving bodies such as a railway, a ship, and an aircraft. Specifically, for example, the present technology is also useful for an application as an ANC installed in a seat of a railway or aircraft, an application for reducing outdoor noise by being installed in an indoor easy chair, and the like.

Configuration Example of Computer

Incidentally, the series of processings described above can be executed by hardware or can be executed by software. In a case where the series of processings is executed by the software, a program configuring that software is installed in a computer. Herein, the computer includes a computer incorporated into dedicated hardware and, for example, a general-purpose personal computer capable of executing various functions by being installed with various programs.

Figure 25:
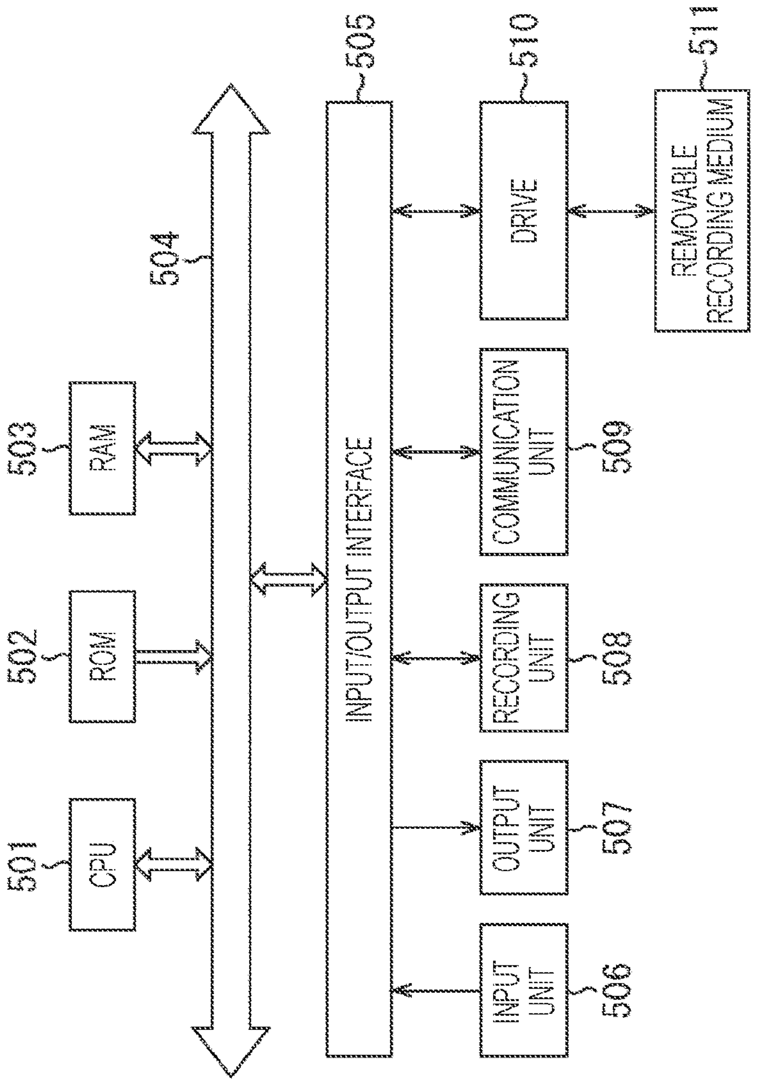
FIG. 25 is a diagram showing a configuration example of a computer.

FIG. 25 is a block diagram showing a configuration example of hardware of a computer which executes the aforementioned sequences of processing by a program.

In the computer, a central processing unit (CPU) 501, a read only memory (ROM) 502, and a random access memory (RAM) 503 are connected to each other by a bus 504.

The bus 504 is further connected to an input/output interface 505. To the input/output interface 505, an input unit 506, an output unit 507, a recording unit 508, a communication unit 509, and a drive 510 are connected.

The input unit 506 includes a keyboard, a mouse, a microphone, an imaging element, and the like. The output unit 507 includes a display, a speaker, and the like. The recording unit 508 includes a hard disk, a nonvolatile memory, and the like. The communication unit 509 includes a network interface and the like. The drive 510 drives a removable recording medium 511 such as a magnetic disk, an optical disk, a magneto-optical disk, or a semiconductor memory.

In the computer configured as described above, the CPU 501 loads, for example, a program recorded in the recording unit 508 into the RAM 503 via the input/output interface 505 and the bus 504 and executes the program, thereby performing the aforementioned series of processings.

The program executed by the computer (CPU 501) can be, for example, recorded on the removable recording medium 511 as a package medium or the like to be provided. Furthermore, the program can be provided via a wired or wireless transmission medium such as a local area network, the Internet, or digital satellite broadcasting.

In the computer, the program can be installed in the recording unit 508 via the input/output interface 505 by attaching the removable recording medium 511 to the drive 510. Furthermore, the program can be received by the communication unit 509 via the wired or wireless transmission medium and installed in the recording unit 508. In addition, the program can be installed in the ROM 502 or the recording unit 508 in advance.

Note that the program executed by the computer may be a program in which the processings are performed in time series according to the order described in the specification, or may be a program in which the processings are performed in parallel or at necessary timings such as when a call is made.

Furthermore, the embodiments of the present technology are not limited to the above embodiments, and various modifications can be made in a scope without departing from the gist of the present technology.

For example, the present technology can adopt the configuration of cloud computing in which one function is shared and collaboratively processed by a plurality of apparatuses via a network.

Furthermore, each step described in the above-described flowcharts can be executed by one apparatus or can also be shared and executed by a plurality of apparatuses.

Moreover, in a case where a plurality of processings is included in one step, the plurality of processings included in the one step can be executed by one apparatus or can also be shared and executed by a plurality of apparatuses.

Moreover, the present technology can adopt the following configurations.

(1)

A noise cancellation signal generation device including:

a reference sensor;

a speaker that outputs sound based on a noise cancellation signal;

a memory that records second information for obtaining a filter coefficient of a noise cancellation filter calculated on the basis of first information obtained in consideration of a change in a relative position between the speaker and a noise cancellation point; and a noise cancellation processor that acquires the second information from the memory using a signal acquired by a sensor, and generates the noise cancellation signal on the basis of the filter coefficient obtained from the second information acquired and a reference signal acquired by the reference sensor.

(2)

The noise cancellation signal generation device according to (1), in which the first information is a transmission characteristic from the speaker to the noise cancellation point.

(3)

The noise cancellation signal generation device according to (1) or (2), in which the noise cancellation point is an ear position of a user.

(4)

The noise cancellation signal generation device according to any one of (1) to (3), in which the speaker is an in-vehicle speaker.

(5)

The noise cancellation signal generation device according to (2), in which a signal acquired by the sensor is an audio signal.

(6)

The noise cancellation signal generation device according to (5), in which the sensor is provided in a device worn on an ear of the user.

(7)

The noise cancellation signal generation device according to (6), in which the memory records the first information and the second information in association with each other for each of a plurality of the relative positions different from each other, and the noise cancellation processor calculates the first information on the basis of the audio signal acquired by the sensor and acquires the second information associated with the calculated first information from the memory.

(8)

The noise cancellation signal generation device according to (2), in which a signal acquired by the sensor is a signal indicating an ear position of a user.

(9)

The noise cancellation signal generation device according to (8), in which the memory records the second information in association with the ear position for each of a plurality of different ear positions.

(10)

The noise cancellation signal generation device according to any one of (2) to (9), in which the second information is a virtual transmission characteristic from the reference sensor to the noise cancellation point, and the noise cancellation processor calculates the filter coefficient on the basis of the first information and the second information.

(11)

The noise cancellation signal generation device according to any one of (2) to (9), in which the second information is the filter coefficient.

(12)

The noise cancellation signal generation device according to any one of (1) to (11), in which the reference sensor is a microphone.

(13)

The noise cancellation signal generation device according to any one of (1) to (11), in which the reference sensor is an acceleration sensor.

(14)

A noise cancellation signal generation method, including, by a noise cancellation signal generation device:

acquiring second information from a memory by using a signal acquired by a sensor, and generating a noise cancellation signal on the basis of a filter coefficient obtained from the second information acquired and a reference signal acquired by a reference sensor, the noise cancellation signal generation device including:

the reference sensor;

a speaker that outputs sound based on the noise cancellation signal; and the memory that records the second information for obtaining the filter coefficient of a noise cancellation filter calculated on the basis of first information obtained in consideration of a change in a relative position between the speaker and a noise cancellation point.

(15)

A program for causing a computer, which controls a noise cancellation signal generation device, to execute a process including steps of:

acquiring second information from a memory by using a signal acquired by a sensor; and generating a noise cancellation signal on the basis of a filter coefficient obtained from the second information acquired and a reference signal acquired by a reference sensor, the noise cancellation signal generation device including:

the reference sensor;

a speaker that outputs sound based on the noise cancellation signal; and the memory that records the second information for obtaining the filter coefficient of a noise cancellation filter calculated on the basis of first information obtained in consideration of a change in a relative position between the speaker and a noise cancellation point.

(16)

A noise cancellation signal generation device including:

a reference sensor;

a speaker that outputs sound based on a noise cancellation signal;

an acquisition unit that acquires, on the basis of a signal acquired by a sensor, second information for obtaining a filter coefficient of a noise cancellation filter calculated on the basis of first information obtained in consideration of a change in a relative position between the speaker and a noise cancellation point; and a noise cancellation processor that generates the noise cancellation signal on the basis of the filter coefficient obtained from the second information acquired and a reference signal acquired by the reference sensor.

(17)

The noise cancellation signal generation device according (16), in which the acquisition unit performs wireless communication with an external device to acquire the second information.

(18)

The noise cancellation signal generation device according to (17), in which the acquisition unit sends the first information, which is calculated on the basis of the signal acquired by the sensor, to the external device and receives the second information sent from the external device in response to the sending of the first information.

(19)

A noise cancellation signal generation method, including:

by a noise cancellation signal generation device including:

a reference sensor; and a speaker that outputs sound based on a noise cancellation signal, acquiring, on the basis of a signal acquired by a sensor, second information, which is for obtaining a filter coefficient of a noise cancellation filter calculated on the basis of first information obtained in consideration of a change in a relative position between the speaker and a noise cancellation point; and generating the noise cancellation signal on the basis of the filter coefficient obtained from the second information acquired and a reference signal acquired by the reference sensor.

(20)

A program for causing a computer, which controls a noise cancellation signal generation device including:

a reference sensor; and a speaker that outputs sound based on a noise cancellation signal, to execute a process including steps of:

acquiring second information, which is for obtaining a filter coefficient of a noise cancellation filter calculated on the basis of first information obtained in consideration of a change in a relative position between the speaker and a noise cancellation point, on the basis of a signal acquired by a sensor; and generating the noise cancellation signal on the basis of the filter coefficient obtained from the second information acquired and a reference signal acquired by the reference sensor.

REFERENCE SIGNS LIST

11-1, 11-2, 11 Ear hole open type device
12-1, 12-2, 12 Control point microphone
13-1, 13-2, 13 Reference sensor
14-1, 14-2, 14 Speaker
76 Memory
151 Search unit
152 ANC filter calculation unit
181 ANC system
191 Noise cancellation unit

The invention claimed is:

1. A noise cancellation signal generation device, comprising:

a reference sensor configured to acquire a reference signal;

a specific sensor configured to acquire a specific signal;

a speaker configured to output sound based on a noise cancellation signal;

a noise cancellation processor configured to:

obtain first information based on a change in a relative position between the speaker and a noise cancellation point; and calculate a noise cancellation filter based on the first information; and a memory configured to record second information in association with the first information to obtain a filter coefficient of the noise cancellation filter, wherein the second information is a virtual transmission characteristic from the reference sensor to the noise cancellation point, the first information is associated with the second information for each of a plurality of mutually different relative positions, the plurality of mutually different relative positions is associated with the noise cancellation point, and the noise cancellation processor is further configured to:

acquire, based on the specific signal acquired by the specific sensor, the second information associated with the first information from the memory, wherein the second information is acquired for a current position of the noise cancellation point; and generate the noise cancellation signal based on the filter coefficient obtained from the acquired second information and the reference signal acquired by the reference sensor.

2. The noise cancellation signal generation device according to claim 1, wherein the first information is a transmission characteristic from the speaker to the noise cancellation point.

3. The noise cancellation signal generation device according to claim 2, wherein the specific signal acquired by the specific sensor is an audio signal.

4. The noise cancellation signal generation device according to claim 3, wherein the specific sensor is provided in a device wearable on a user's ear.

5. The noise cancellation signal generation device according to claim 4, wherein the noise cancellation processor is further configured to calculate the first information based on the audio signal acquired by the specific sensor.

6. The noise cancellation signal generation device according to claim 2, wherein the specific signal acquired by the specific sensor indicates a user ear position.

7. The noise cancellation signal generation device according to claim 6, wherein the memory is further configured to record the second information in association with the user ear position for each of a plurality of different user ear positions.

8. The noise cancellation signal generation device according to claim 2, wherein the noise cancellation processor is further configured to calculate the filter coefficient based on the first information and the second information.

9. The noise cancellation signal generation device according to claim 2, wherein the second information is the filter coefficient.

10. The noise cancellation signal generation device according to claim 1, wherein the noise cancellation point is a user ear position.

11. The noise cancellation signal generation device according to claim 1, wherein the speaker is an in-vehicle speaker.

12. The noise cancellation signal generation device according to claim 1, wherein the reference sensor is a microphone.

13. The noise cancellation signal generation device according to claim 1, wherein the reference sensor is an acceleration sensor.

14. A noise cancellation signal generation method, comprising:

acquiring, by a reference sensor, a reference signal;

acquiring, by a specific sensor, a specific signal;

obtaining, by a noise cancellation processor, first information based on a change in a relative position between a speaker and a noise cancellation point;

calculating, by the noise cancellation processor, a noise cancellation filter based on the first information;

recording, at a memory, second information in association with the first information, wherein the second information is a virtual transmission characteristic from the reference sensor to the noise cancellation point, the first information is associated with the second information for each of a plurality of mutually different relative positions, and the plurality of mutually different relative positions is associated with the noise cancellation point;

acquiring, based on the specific signal acquired by the specific sensor, the second information from the memory, wherein the second information is acquired for a current position of the noise cancellation point;

obtaining, by the noise cancellation processor, a filter coefficient of the noise cancellation filter using the second information;

generating, by the noise cancellation processor, a noise cancellation signal based on the filter coefficient and the reference signal; and outputting, by the speaker, sound based on the noise cancellation signal.

15. A non-transitory computer-readable medium having stored thereon computer executable instructions, which when executed by one or more processors, cause the one or more processors to execute operations, the operations comprising:

acquiring a reference signal from a reference sensor;

acquiring a specific signal from a specific sensor;

obtaining first information, wherein the first information is obtained based on a change in a relative position between a speaker and a noise cancellation point;

calculating a noise cancellation filter based on the first information;

recording second information in association with the first information at a memory, wherein the second information is a virtual transmission characteristic from the reference sensor to the noise cancellation point, the first information is associated with the second information for each of a plurality of mutually different relative positions, and the plurality of mutually different relative positions is associated with the noise cancellation point;

acquiring, based on the specific signal acquired by the specific sensor, the second information from the memory, wherein the second information is acquired for a current position of the noise cancellation point;

obtaining a filter coefficient of the noise cancellation filter using the second information;

generating a noise cancellation signal based on the filter coefficient and the reference signal; and controlling the speaker to output sound based on the noise cancellation signal.

16. A noise cancellation signal generation device, comprising:

a reference sensor configured to acquire a reference signal;

a specific sensor configured to acquire a specific signal;

a speaker configured to output sound based on a noise cancellation signal;

a noise cancellation processor configured to:

obtain first information based on a change in a relative position between the speaker and a noise cancellation point; and calculate a noise cancellation filter based on the first information; and a wireless transceiver configured to acquire, based on the specific signal acquired by acquired the specific sensor, second information to obtain a filter coefficient of the noise cancellation filter, wherein the second information is acquired from a database of an external device, the database includes the second information in association with the first information, the second information is a virtual transmission characteristic from the reference sensor to the noise cancellation point, the first information is associated with the second information for each of a plurality of mutually different relative positions, the plurality of mutually different relative positions is associated with the noise cancellation point, the second information is acquired for a current position of the noise cancellation point, and the noise cancellation processor is further configured to generate the noise cancellation signal based on the filter coefficient and the reference signal.

17. The noise cancellation signal generation device according to claim 16, wherein the wireless transceiver is further configured to perform wireless communication with the external device to acquire the second information.

18. The noise cancellation signal generation device according to claim 17, wherein the wireless transceiver is further configured to:

transmit the first information to the external device; and receive the second information from the external device based on the transmission of the first information.

19. A noise cancellation signal generation method, comprising:

acquiring, by a reference sensor, a reference signal;

acquiring, by a specific sensor, a specific signal;

obtaining, by a noise cancellation processor, first information based on a change in a relative position between a speaker and a noise cancellation point;

calculating, by the noise cancellation processor, a noise cancellation filter based on the first information;

acquiring, by a wireless transceiver, based on the specific signal acquired by the specific sensor, second information from a database of an external device, wherein the database includes the second information in association with the first information, the second information is a virtual transmission characteristic from the reference sensor to the noise cancellation point, the first information is associated with the second information for each of a plurality of mutually different relative positions, the plurality of mutually different relative positions is associated with the noise cancellation point, and the second information is acquired for a current position of the noise cancellation point;

obtaining, by the noise cancellation processor, a filter coefficient of the noise cancellation filter using the second information;

generating, by the noise cancellation processor, a noise cancellation signal based on the filter coefficient and the reference signal; and outputting, by the speaker, sound based on the noise cancellation signal.

20. A non-transitory computer-readable medium having stored thereon computer executable instructions, which when executed by one or more processors, cause the one or more processors to execute operations, the operations comprising:

acquiring a reference signal from a reference sensor;

acquiring a specific signal from a specific sensor;

obtaining first information based on a change in a relative position between a speaker and a noise cancellation point;

calculating a noise cancellation filter based on the first information;

acquiring, based on the specific signal acquired by the specific sensor, second information from a database of an external device, wherein the database includes the second information in association with the first information, the second information is a virtual transmission characteristic from the reference sensor to the noise cancellation point, the first information is associated with the second information for each of a plurality of mutually different relative positions, the plurality of mutually different relative positions is associated with the noise cancellation point, and the second information is acquired for a current position of the noise cancellation point;

obtaining a filter coefficient of the noise cancellation filter using the second information;

generating a noise cancellation signal based on the filter coefficient and the reference signal; and controlling the speaker to output sound based on the noise cancellation signal.

* * * * *